(12) United States Patent
Kawamura et al.

(10) Patent No.: US 9,137,658 B2
(45) Date of Patent: *Sep. 15, 2015

(54) ELECTRONIC KEY REGISTRATION SYSTEM

(71) Applicant: KABUSHIKI KAISHA TOKAI RIKA DENKI SEISAKUSHO, Aichi (JP)

(72) Inventors: Daisuke Kawamura, Aichi (JP); Hiroaki Iwashita, Aichi (JP); Masaki Hayashi, Aichi (JP); Toshihiro Nagae, Aichi (JP); Hisashi Kato, Aichi (JP); Tetsuya Egawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 30 days.

This patent is subject to a terminal disclaimer.

(21) Appl. No.: 13/903,342

(22) Filed: May 28, 2013

(65) Prior Publication Data

US 2013/0329890 A1 Dec. 12, 2013

(30) Foreign Application Priority Data

Jun. 6, 2012 (JP) .................................. 2012-129305

(51) Int. Cl.

| | |
|---|---|
| *H04L 9/08* | (2006.01) |
| *H04W 12/04* | (2009.01) |
| *G07C 9/00* | (2006.01) |
| *H04L 9/32* | (2006.01) |
| *H04L 29/06* | (2006.01) |
| *B60R 25/24* | (2013.01) |

(52) U.S. Cl.

CPC ............... *H04W 12/04* (2013.01); *B60R 25/24* (2013.01); *G07C 9/00174* (2013.01); *H04L 9/0816* (2013.01); *H04L 9/0869* (2013.01); *H04L 9/3271* (2013.01); *H04L 63/061* (2013.01); *H04L 2209/80* (2013.01); *H04L 2209/84* (2013.01)

(58) Field of Classification Search

CPC ............................. H04L 63/0442; H04L 9/08
USPC .......................................................... 713/150
See application file for complete search history.

(56) References Cited

U.S. PATENT DOCUMENTS

| | | | |
|---|---|---|---|
| 5,708,712 A | 1/1998 | Brinkmeyer et al. | |
| 5,838,251 A | 11/1998 | Brinkmeyer et al. | |

(Continued)

FOREIGN PATENT DOCUMENTS

| | | |
|---|---|---|
| JP | 2009-302848 | 12/2009 |
| JP | 2011-020475 | 2/2011 |

OTHER PUBLICATIONS

Search report from E.P.O., mail date is Mar. 17, 2014.
U.S. Appl. No. 13/863,469 to Takahiro Shimizu et al., filed Apr. 16, 2013.

(Continued)

*Primary Examiner* — Thanhnga B Truong
*Assistant Examiner* — Khalil Naghdali
(74) *Attorney, Agent, or Firm* — Greenblum & Bernstein, P.L.C.

(57) ABSTRACT

An offline immobilizer ECU reads an encryption key generation code from an offline additional electronic key and generates an electronic key encryption key for the offline additional electronic key using the encryption key generation code and a communication subject key encryption key held by the immobilizer ECU. The immobilizer ECU stores, in a memory, the generated electronic key encryption key and a key ID code that is read from the offline additional electronic key.

7 Claims, 26 Drawing Sheets

(56) References Cited

U.S. PATENT DOCUMENTS

| | | | | |
|---|---|---|---|---|
| 8,335,925 | B2* | 12/2012 | Taugbol | 713/185 |
| 2008/0059806 | A1* | 3/2008 | Kishida et al. | 713/186 |
| 2010/0208895 | A1* | 8/2010 | Boneh et al. | 380/278 |
| 2010/0220857 | A1 | 9/2010 | Kawamura et al. | |
| 2010/0333186 | A1* | 12/2010 | Chan et al. | 726/10 |
| 2012/0124385 | A1* | 5/2012 | Klasen et al. | 713/179 |

OTHER PUBLICATIONS

U.S. Appl. No. 13/871,333 to Daisuke Kawamura et al., filed Apr. 26, 2013.

U.S. Appl. No. 13/874,794 to Daisuke Kawamura et al., filed May 1, 2013.

U.S. Appl. No. 13/903,233 to Daisuke Kawamura et al., filed May 28, 2013.

* cited by examiner

Fig.3
Initial Manufacturing
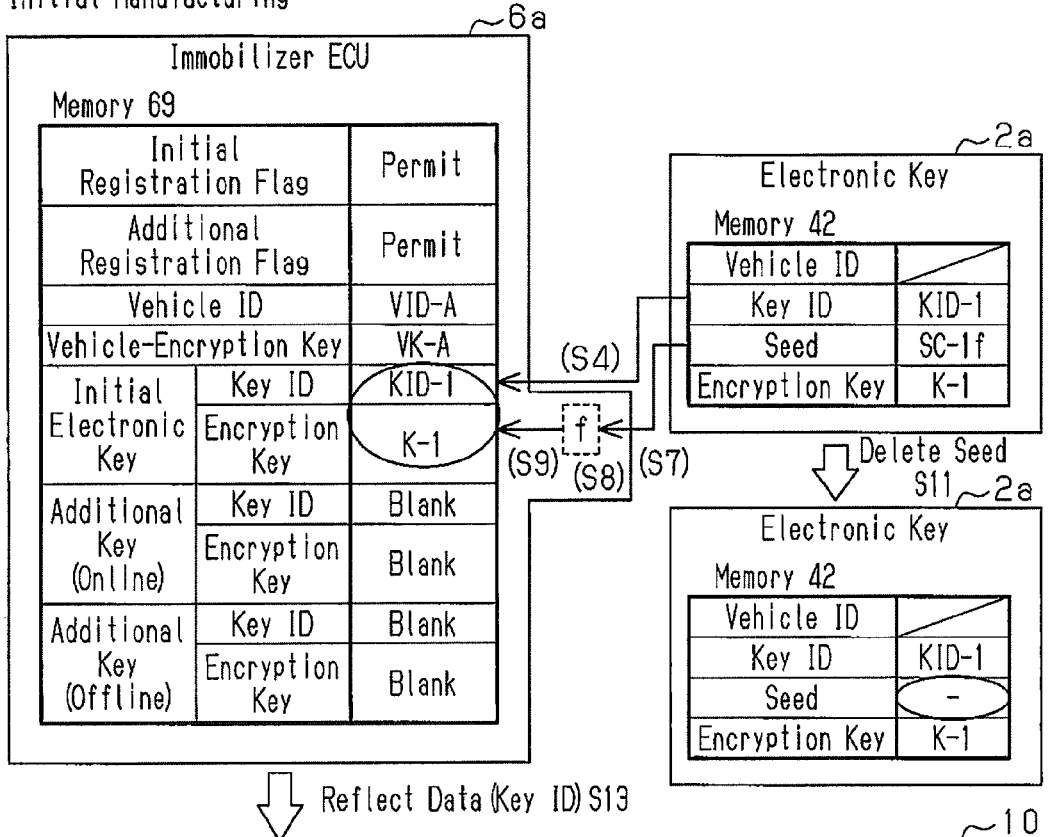
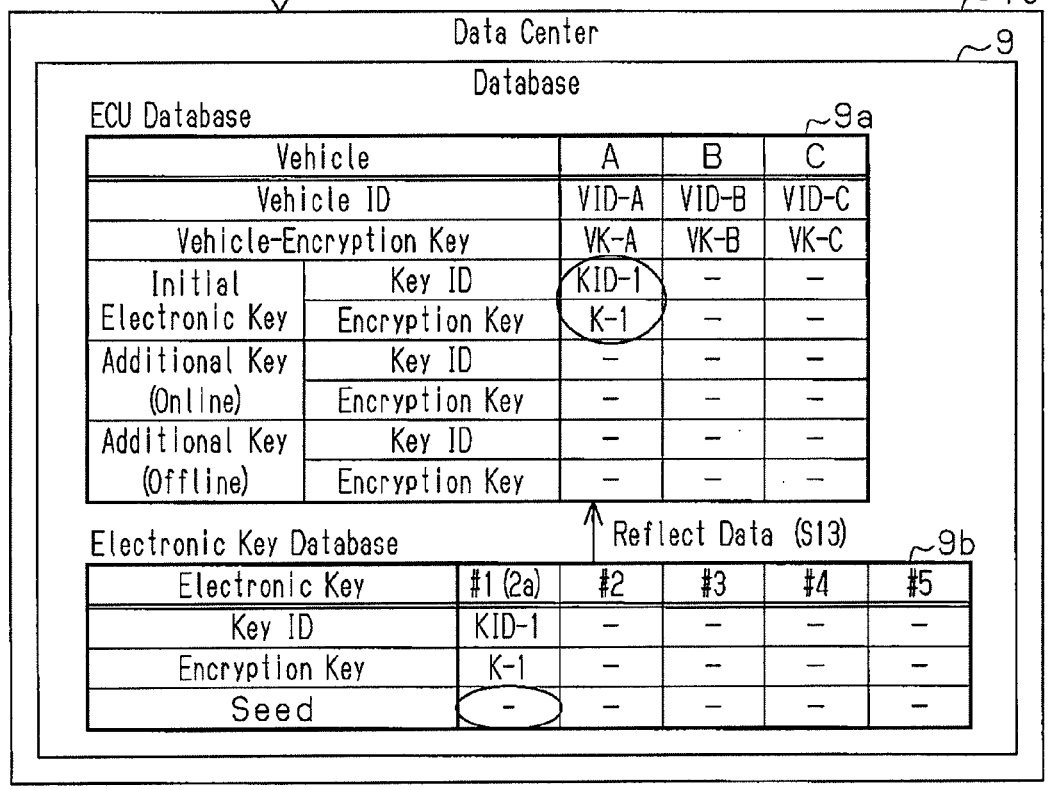

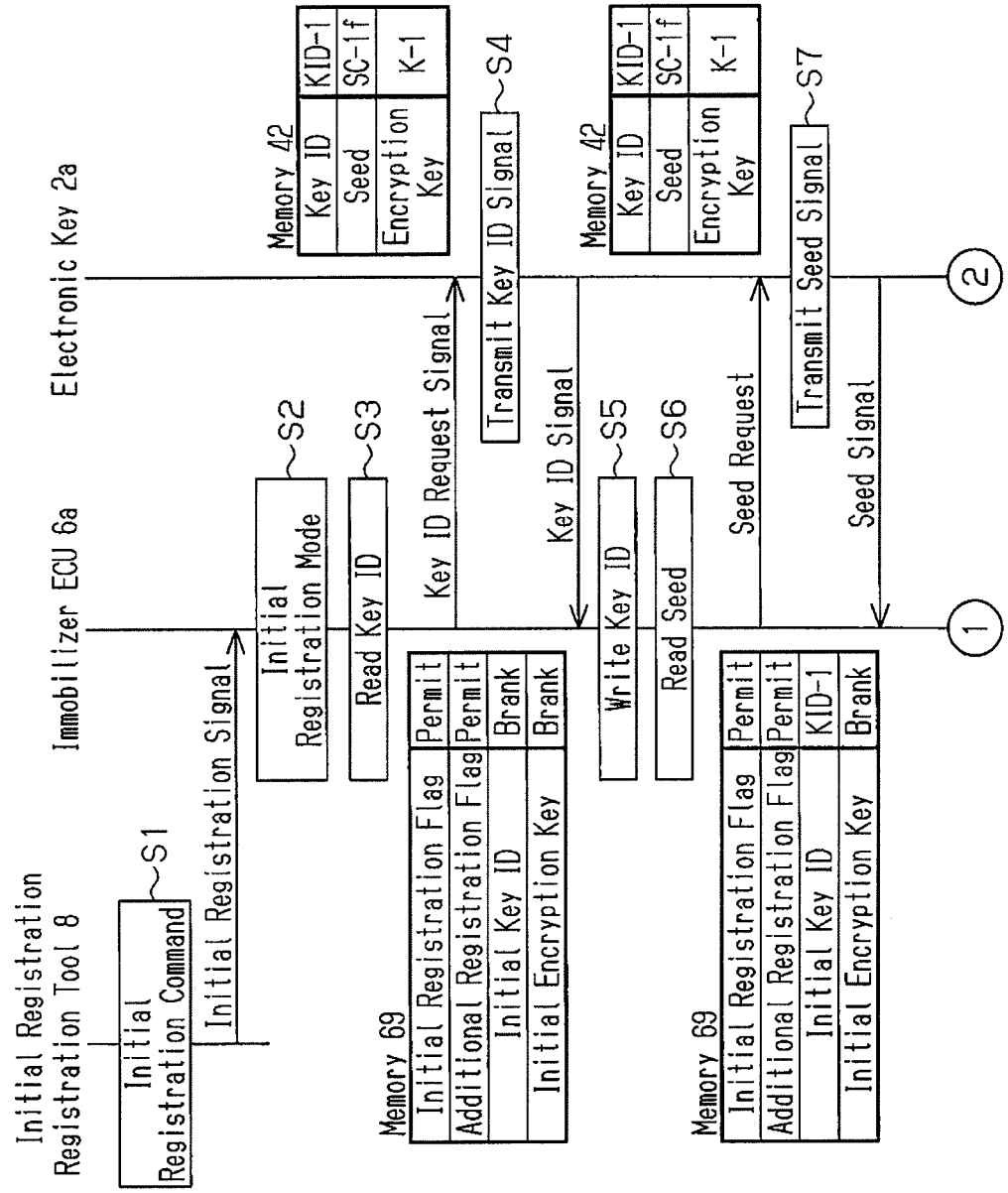

Additional Electronic Key Manufacturing (Online)

Additional Electronic Key Manufacturing (Offline)

Fig.9
Additional Registration (Offline)
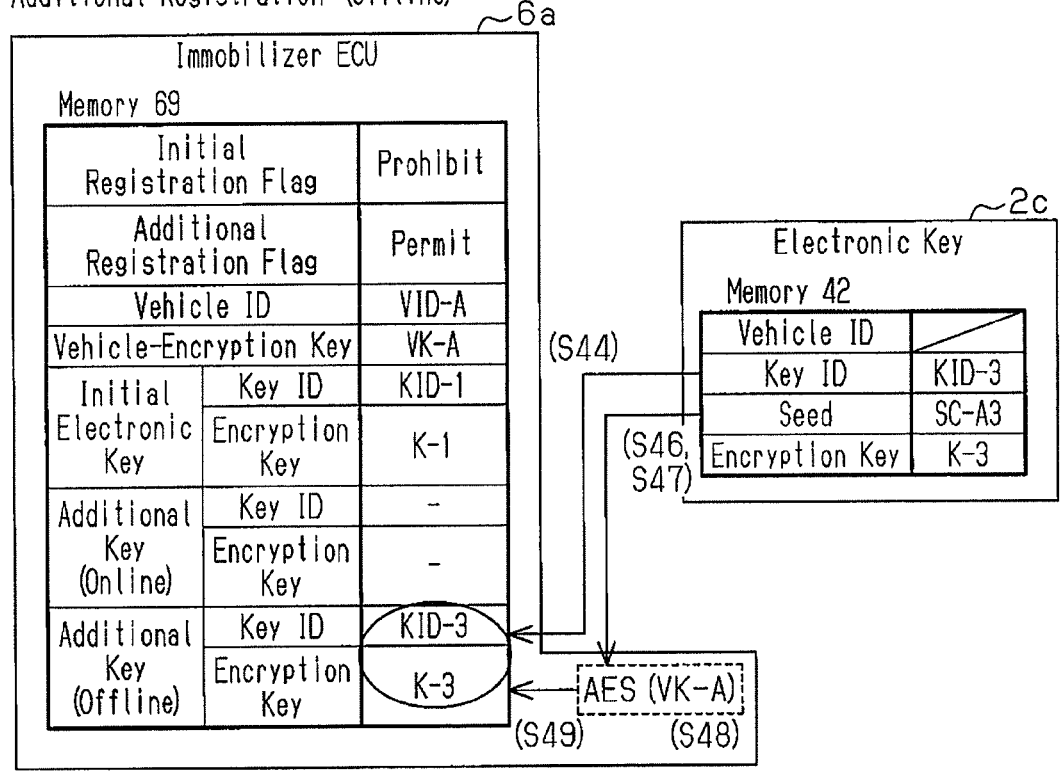
Without access to data center
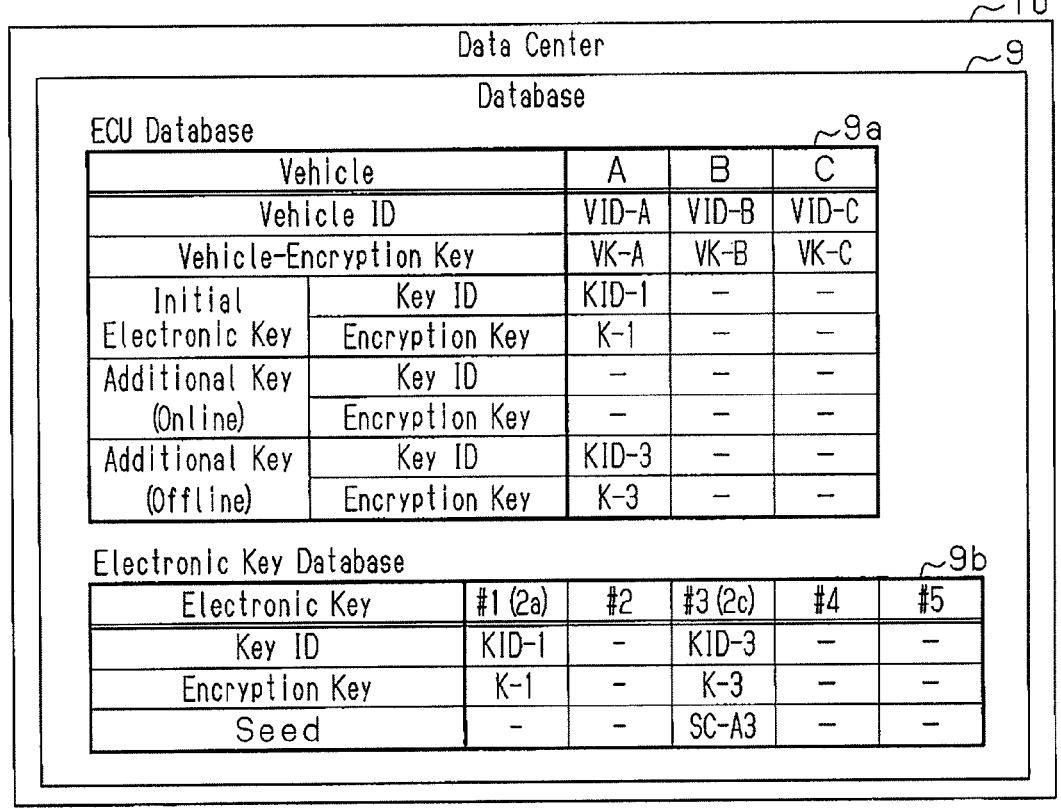

Fig.11
Replacement ECU Manufacturing (Online)

Immobilizer ECU ~6b

Memory 69

| Initial Registration Flag | Prohibit |
|---|---|
| Additional Registration Flag | Permit |
| Vehicle ID | VID-B |
| Vehicle-Encryption Key | VK-B |
| Initial Electronic Key — Key ID | — |
| Initial Electronic Key — Encryption Key | — |
| Additional Key (Online) — Key ID | — |
| Additional Key (Online) — Encryption Key | — |
| Additional Key (Offline) — Key ID | — |
| Additional Key (Offline) — Encryption Key | — |

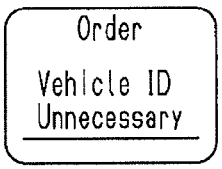

Order
Vehicle ID
Unnecessary

↓ Reflect Data

Data Center ~10

Database ~9

ECU Database ~9a

| Vehicle | | A | B | C |
|---|---|---|---|---|
| Vehicle ID | | VID-A | VID-B | VID-C |
| Vehicle-Encryption Key | | VK-A | VK-B | VK-C |
| Initial Electronic Key | Key ID | KID-1 | — | — |
| | Encryption Key | K-1 | — | — |
| Additional Key (Online) | Key ID | KID-2 | — | — |
| | Encryption Key | K-2 | — | — |
| Additional Key (Offline) | Key ID | — | — | — |
| | Encryption Key | — | — | — |

Electronic Key Database ~9b

| Electronic Key | #1 (2a) | #2 (2b) | #3 | #4 | #5 |
|---|---|---|---|---|---|
| Key ID | KID-1 | KID-2 | — | — | — |
| Encryption Key | K-1 | K-2 | — | — | — |
| Seed | — | — | — | — | — |

Fig.14
Replacement ECU Manufacturing (Offline)

Immobilizer ECU ~6c

Memory 69

| Initial Registration Flag | Prohibit |
|---|---|
| Additional Registration Flag | Permit |
| Vehicle ID | VID-A |
| Vehicle-Encryption Key | VK-A |
| Initial Electronic Key — Key ID | KID-1 |
| Initial Electronic Key — Encryption Key | K-1 |
| Additional Key (Online) — Key ID | – |
| Additional Key (Online) — Encryption Key | – |
| Additional Key (Offline) — Key ID | KID-3 |
| Additional Key (Offline) — Encryption Key | K-3 |

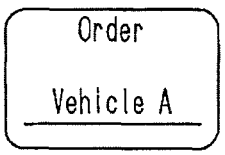

Order
Vehicle A

↑ Reflect Data

Data Center ~10

Database ~9

ECU Database ~9a

| Vehicle | | A | B | C |
|---|---|---|---|---|
| Vehicle ID | | VID-A | VID-B | VID-C |
| Vehicle-Encryption Key | | VK-A | VK-B | VK-C |
| Initial Electronic Key | Key ID | KID-1 | – | – |
| Initial Electronic Key | Encryption Key | K-1 | – | – |
| Additional Key (Online) | Key ID | – | – | – |
| Additional Key (Online) | Encryption Key | – | – | – |
| Additional Key (Offline) | Key ID | KID-3 | – | – |
| Additional Key (Offline) | Encryption Key | K-3 | – | – |

Electronic Key Database ~9b

| Electronic Key | #1 (2a) | #2 | #3 (2c) | #4 | #5 |
|---|---|---|---|---|---|
| Key ID | KID-1 | – | KID-3 | – | – |
| Encryption Key | K-1 | – | K-3 | – | – |
| Seed | – | – | SC-A3 | – | – |

Fig.15
Replacement ECU Registration (Offline)
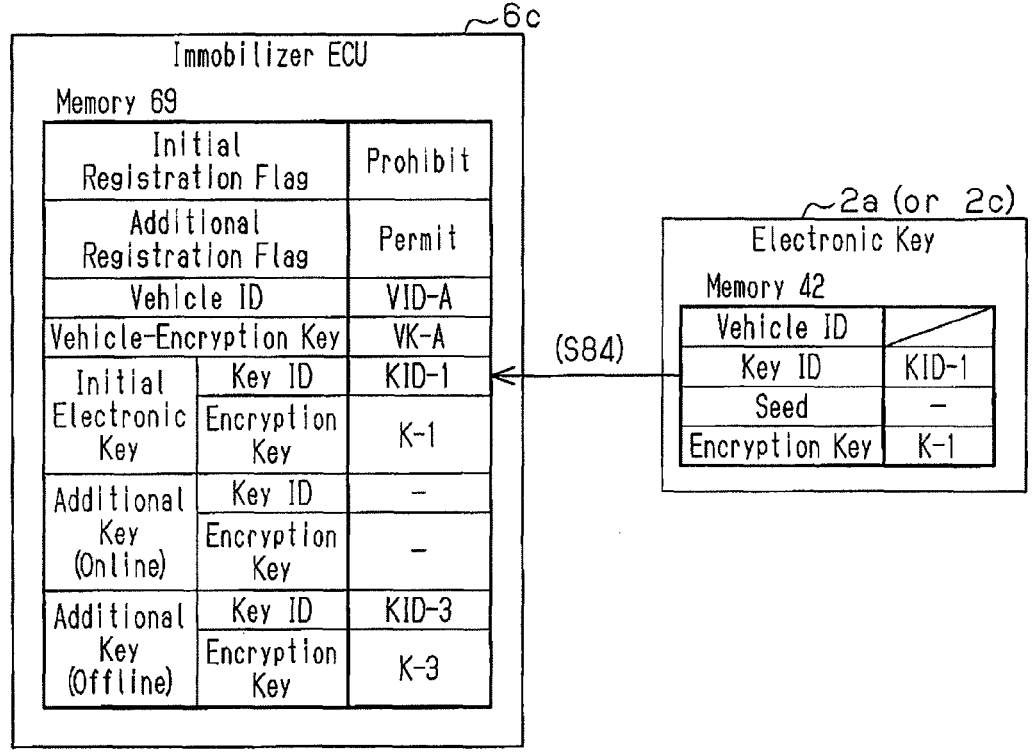
Without access to data center
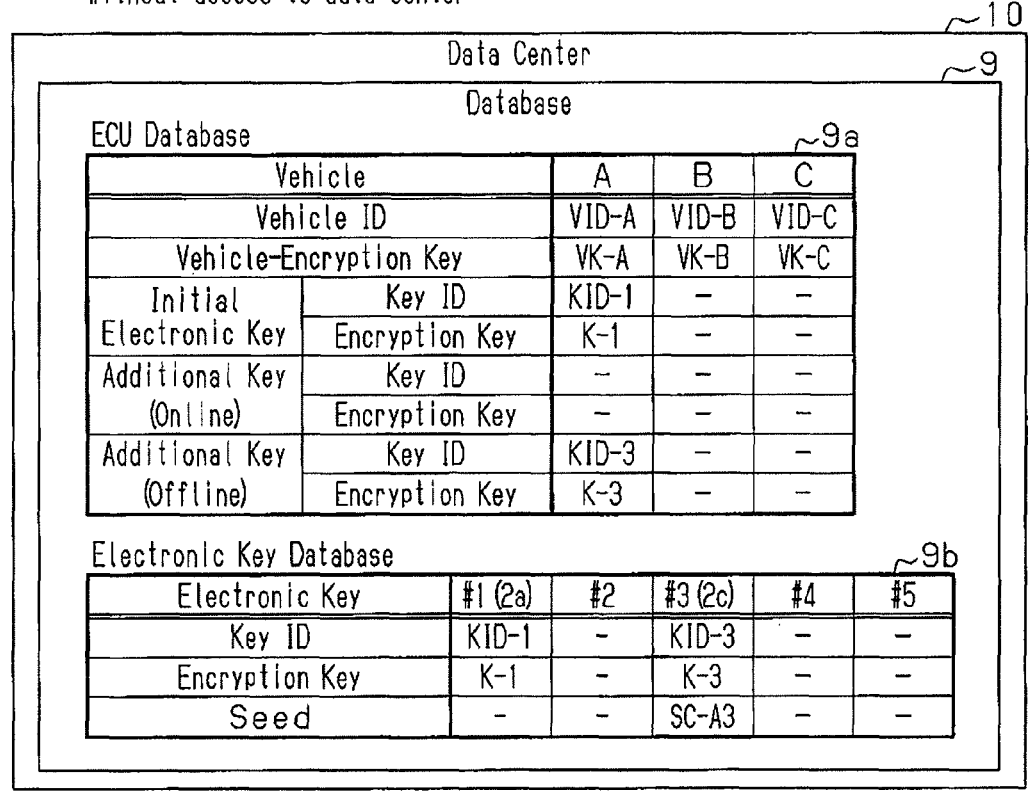

Initial Manufacturing

ELECTRONIC KEY REGISTRATION SYSTEM

CROSS-REFERENCE TO RELATED APPLICATIONS

This application is based upon and claims the benefit of priority from prior Japanese Patent Application No. 2012-129305, filed on Jun. 6, 2012, the entire contents of which are incorporated herein by reference.

BACKGROUND ART

The present invention relates to a registration system that registers an electronic key to a controller of a communication subject.

A known electronic key system performs wireless communication between a vehicle and an electronic key, which is held by a user of the vehicle to lock and unlock doors or start and stop the engine when the electronic key is verified. In such an electronic key system, the communication between the electronic key and the vehicle is encrypted and thereby protected to maintain a certain level of security (for example, refer to Japanese Laid-Open Patent Publication No. 2009-302848).

Encrypted communication may be performed by employing symmetric-key cryptosystem that uses the same encryption key for encryption and decryption. A shared key, that is, the same encryption key, is registered to an electronic key and a vehicle that perform encrypted communication in compliance with the symmetric-key cryptosystem. The registration of the encryption key to the electronic key and the vehicle is performed when registering the electronic key to a controller of the vehicle. The controller verifies the electronic key by comparing identification information received from the electronic key with identification information stored in its memory.

In an electronic key registration system that registers an electronic key to a controller, to avoid registration of an electronic key other than that of the user, the inventors of the present invention have considered storing in advance a vehicle ID code (identification information unique to a communication subject) of a vehicle (communication subject) to the controller and the electronic key, and then shipping the controller and the electronic key together out of a factory. In this example, however, the shipping becomes complicated, and an additional key cannot be registered at a later date. Such a problem is not limited to an electronic key system used in a vehicle and may also occur in an electronic key system used in a building such as a house.

SUMMARY

It is an object of the present invention to provide an electronic key registration system that facilitates registration of an electronic key to a controller while maintaining a certain security level.

To achieve the above object, one aspect of the present invention is an electronic key registration system that registers an electronic key to a communication subject. The electronic key registration system includes a controller arranged in the communication subject and capable of accessing a data center through at least a network. An initial electronic key, an online additional electronic key, and an offline additional electronic key, each hold a unique key ID code and a unique encryption key. Each of the electronic keys is configured to use the corresponding electronic key encryption key when performing a wireless verification communication with the controller of the communication subject. A computer-readable medium has instructions stored thereon that include first to ninth set of instructions.

The first set of instructions are configured to store, in the controller, a unique communication subject ID code and a communication subject encryption key that is used for the registration, and store, in the data center, the communication subject ID code and the communication subject encryption key that are stored in the controller.

The second set of instructions are configured to store, in the online additional electronic key, the key ID code and the electronic key encryption key corresponding to the online additional electronic key.

The third set of instructions are configured to store, in the data center, the key ID code and the electronic key encryption key that are stored in the online additional electronic key The fourth set of instructions are configured to transmit, from the controller online to the data center, the communication subject ID code and the key ID code of the online additional electronic key.

The fifth set of instructions are configured to generate, with the data center, an encryption key generation code using the communication subject encryption key corresponding to the communication subject ID code and the electronic key encryption key corresponding to the key ID code of the online additional electronic key that are stored in the data center.

The sixth set of instructions are configured to obtain the encryption key generation code from the data center with the controller online, generate the electronic key encryption key of the online additional electronic key from the obtained encryption key generation code with the controller online, and store the electronic key encryption key of the online additional electronic key in the controller.

The seventh set of instructions are configured to store, in the offline additional electronic key, the electronic key encryption key corresponding to the key ID code of the offline additional electronic key, and store, in the offline additional electronic key, an encryption key generation code generated using the communication subject encryption key corresponding to the communication subject ID code that is in correspondence with information indicated on an order sheet and the stored electronic key encryption key.

The eighth set of instructions are configured to obtain, with the data center, the electronic key encryption key and the key ID code that are stored in the offline additional electronic key, and store, in the data center, the electronic key encryption key and the key ID code in association with the communication subject ID code.

The ninth set of instructions are configured to read, with the controller offline, the encryption key generation code from the offline additional electronic key, generate an electronic key encryption key for the offline additional electronic key using the communication subject key encryption key stored in the controller, and store, in the controller, the generated electronic key encryption key and the key ID code read from the offline additional electronic key.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a schematic diagram illustrating initial registration steps;

FIGS. 4A and 4B illustrate a sequence chart of the initial registration steps;

FIG. 9 is a schematic diagram illustrating manufacturing steps of an additional electronic key;

FIG. 11 is a schematic diagram illustrating manufacturing steps of a replacement ECU;

FIG. 14 is a schematic diagram illustrating manufacturing steps of a replacement ECU;

FIG. 15 is a schematic diagram illustrating registration steps of the replacement ECU;

DETAILED DESCRIPTION OF EMBODIMENT

An electronic key registration system according to a first embodiment of the present invention will now be described with reference to FIGS. 1 to 16.

Figure 1:
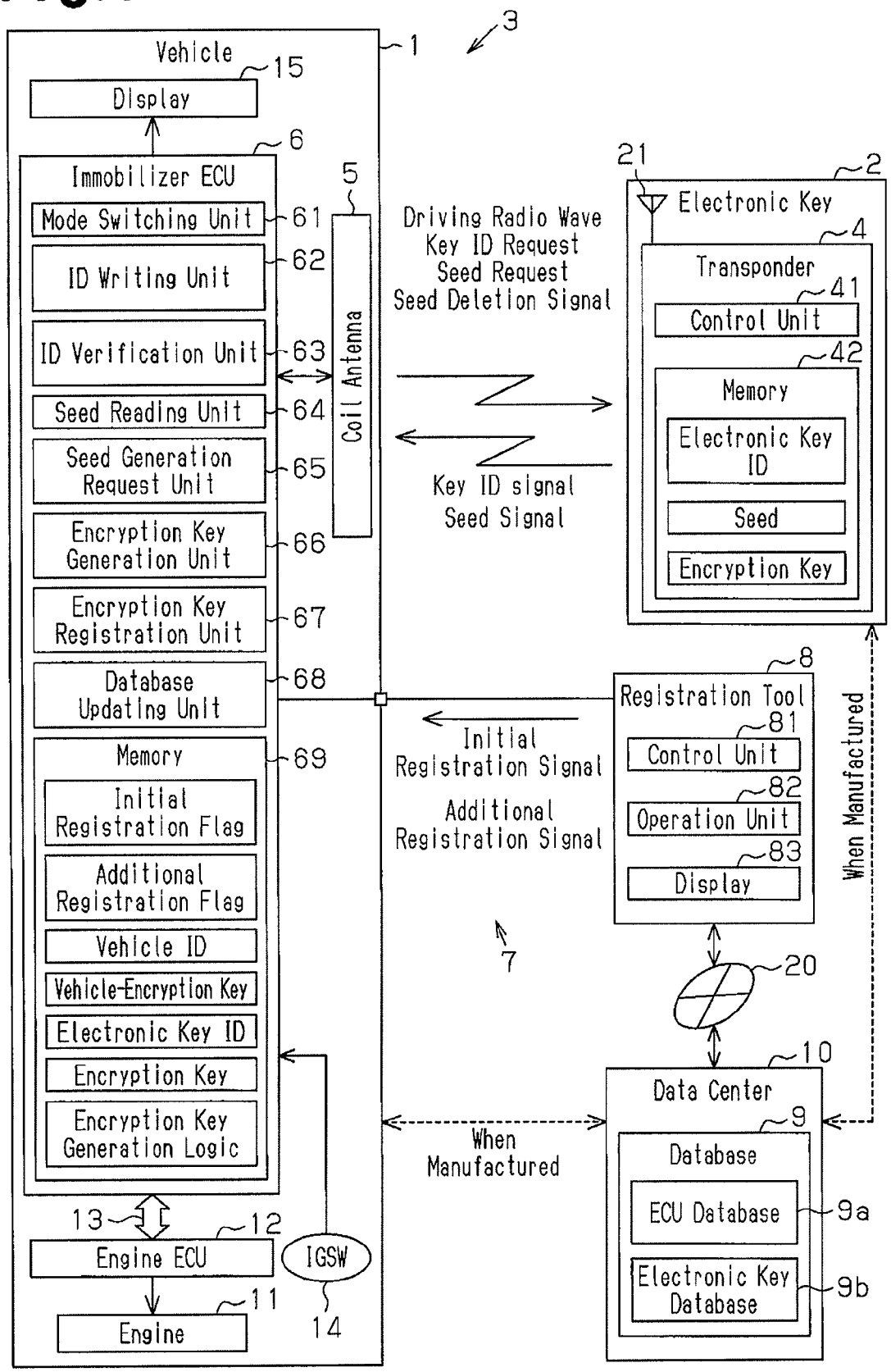
FIG. 1 is a block diagram of an electronic key registration system.

Referring to FIG. 1, a vehicle 1 includes an immobilizer that performs, for example, near field communication with an electronic key 2 to execute ID verification. In the description hereafter, near field communication refers to wireless communication performed within a communication distance of several centimeters. The electronic key 2 includes a transponder 4, which may be an ID tag. The transponder 4 is activated by drive radio waves transmitted from a coil antenna 5 of the vehicle 1, and transmits a key ID signal. The immobilizer system 3 includes an immobilizer ECU 6. The immobilizer ECU 6 performs ID verification based on the key ID signal sent from the transponder 4. The vehicle 1 is one example of a communication subject. The immobilizer system 3 is one example of an electronic key system. The immobilizer ECU 6 is one example of a controller.

An in-vehicle LAN 13 connects the immobilizer ECU 6 to an engine ECU 12, which controls an engine 11. The immobilizer ECU 6 includes a memory 69. An ID code of the electronic key 2 is registered to the memory 69. The ID code of the electronic key 2 is associated with the vehicle 1. The immobilizer ECU 6 is connected to the coil antenna 5 that is capable of transmitting and receiving radio waves on, for example, the low frequency (LF) band and a high frequency (HF) band. In the preferred example, the coil antenna 5 is a magnetic field antenna and arranged in a key cylinder.

The transponder 4 includes a control unit 41 that controls the communication operation of the transponder 4. The control unit 41 includes a memory 42. A key ID code KID unique to the electronic key 2 is registered to the memory 42. The key ID code KID may be a transponder code. The transponder 4 includes a transmission-reception antenna 21 that is capable of transmitting and receiving radio waves on LH band radio waves and HF band radio waves. The antenna 21 may have the same structure as a coil antenna 5.

When detecting the insertion of the electronic key 2 into the key cylinder, the immobilizer ECU 6 intermittently transmits drive radio waves from the coil antenna 5. For example, if a user enters the vehicle 1 and inserts the electronic key 2 into the key cylinder to start the engine 11, when the key cylinder is operated, the transponder 4 receives the drive radio waves transmitted from the coil antenna 5 with the transmission-reception antenna 21. The drive radio waves function as a power supply that activates the transponder 4. The activated transponder 4 transmits a key ID signal, which includes the key ID code, from the transmission-reception antenna 21. When the coil antenna 5 receives the key ID signal from the transponder 4, the immobilizer ECU 6 performs ID verification (immobilizer verification) on the key ID code in the received key ID signal. When ID verification is accomplished, the immobilizer ECU 6 stores an ID verification accomplishment flag in the memory 69.

An ignition switch (IGSW) 14 is arranged in the key cylinder to detect the rotational position of the electronic key 2. For example, when the ignition switch 14 detects that the electronic key 2 has been arranged at an engine start position, the engine ECU 12 receives an ID verification result from the immobilizer ECU 6. When verification has been accomplished, the engine ECU 12 starts ignition control and fuel injection control for the engine 11 and starts the engine 11.

In addition to verifying the key ID code of the electronic key 2, the immobilizer ECU 6 performs challenge-response verification. The challenge-response verification will now be described. First, the vehicle 1 transmits a challenge code, which is, for example, a random number code, from the vehicle 1 to the electronic key 2. The electronic key 2 computes a response code and sends back the response code to the vehicle 1. The immobilizer ECU 6 of the vehicle 1 also computes a response code and determines whether or not the computed response code conforms to the response code received from the electronic key 2. When the response codes are in conformance, the electronic key 2 is verified. In the illustrated example, symmetric-key cryptosystem that uses the same encryption key is employed for the verifications performed by the immobilizer ECU 6 and the transponder 4. The electronic key 2 and the immobilizer ECU 6 store the same encryption key. Each of the electronic key 2 and the immobilizer ECU 6 performs a computation using the stored encryption key to generate a challenge code from the response code.

The memory 42 of the transponder 4 stores the key ID code KID of the electronic key 2, a SEED code SC used to generate an electronic key encryption key K, and the electronic key encryption key K used for verification. The SEED code SC differs between each electronic key. The SEED code SC is also referred to as an encryption key generation code.

In the description hereafter, the term online refers to a situation in which the immobilizer ECU 6 can communicate with a data center 10 through at least a network 20, such as communications network. The term offline refers to a situation in which the immobilizer ECU 6 cannot communicate with the data center 10 through at least the network 20.

The term initial registration refers to the first registration of the electronic key 2 to the vehicle 1 (e.g., immobilizer ECU 6). The term additional registration refers to the registration of a further electronic key performed when at least one electronic key has already been registered to the vehicle 1 (e.g., after vehicle has been shipped out from a vehicle manufacturer). The term online additional registration refers to the additional registration of an electronic key performed online. The term offline additional registration refers to the additional registration of an electronic key performed offline. The electronic key 2 that undergoes initial registration may be referred to as initial electronic key 2a. The electronic key 2 that undergoes online additional registration may be referred to as an online additional electronic key 2b or a first additional electronic key. The electronic key 2 that undergoes offline additional registration may be referred to as an offline additional electronic key 2c or a second additional electronic key.

The term replacement ECU registration refers to, when replacing an immobilizer ECU with a new replacement immobilizer ECU, registration of an electronic key to the replacement immobilizer ECU. The term online replacement ECU registration refers to a replacement ECU registration that is performed online. The term offline replacement ECU registration refers to a replacement ECU registration that is performed offline. The immobilizer ECU 6 that undergoes online replacement ECU registration may be referred to as an online replacement immobilizer ECU 6b. The immobilizer ECU 6 that undergoes offline replacement ECU registration may be referred to as an offline replacement immobilizer ECU 6c.

An initial registration flag indicating that initial registration of the electronic key 2 is permitted is set in the memory 69 of the immobilizer ECU 6. An additional registration flag indicating that additional registration of the electronic key 2 is permitted is also set in the memory 69. Further, the memory 69 stores a vehicle ID code VID that is unique identification information, a vehicle encryption key VK used for registration, an electronic key encryption key K used for verification, and a key generation logic used to generate the electronic key encryption key VK. The vehicle encryption key VK may be referred to as a communication subject encryption key. The vehicle ID code VID may be referred to as a communication subject ID code.

Figure 2:
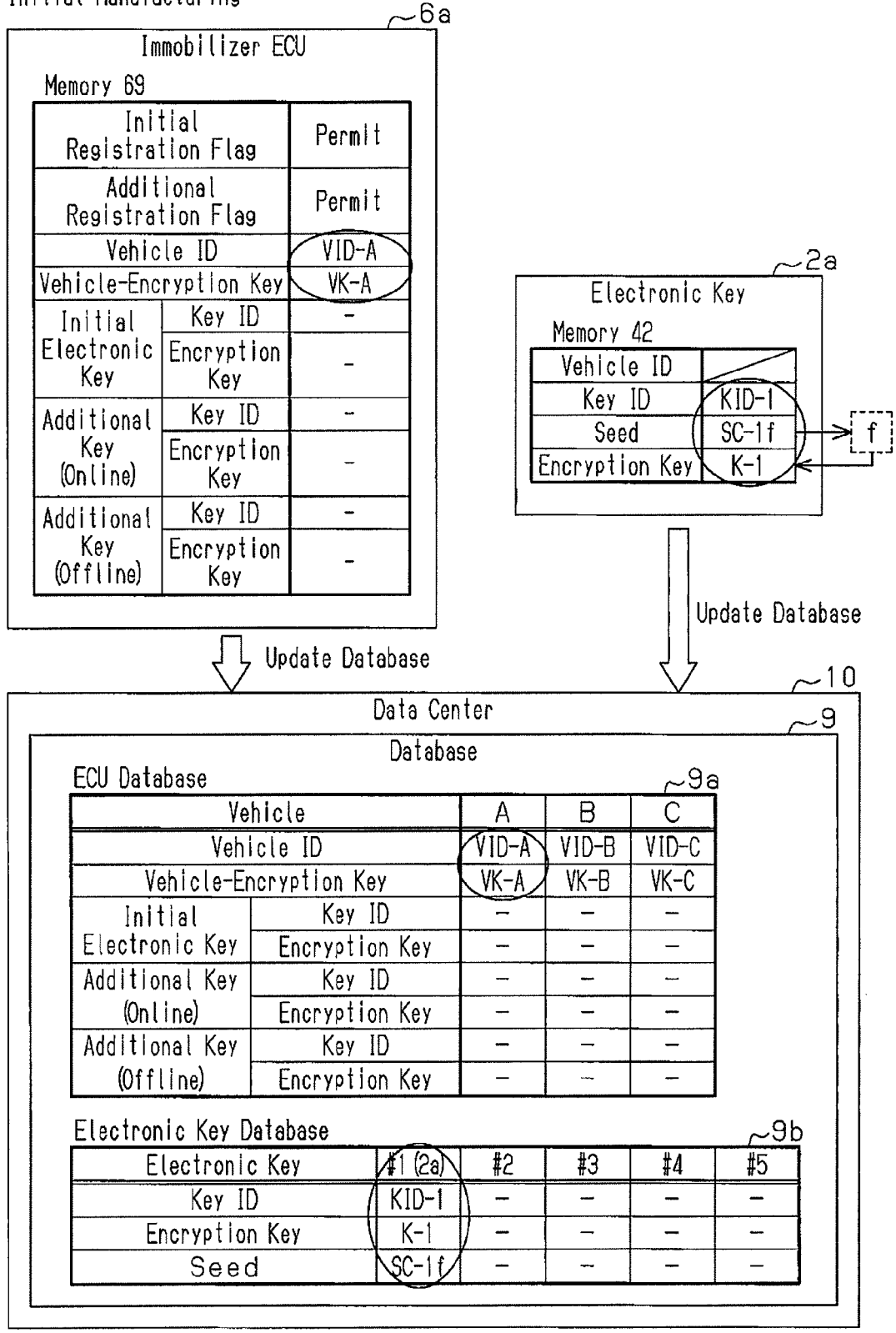
FIG. 2 is a schematic diagram illustrating manufacturing steps of an initial electronic key.

The immobilizer system 3 includes an electronic key registration system 7 that registers the electronic key 2 to the immobilizer ECU 6. The electronic key registration system 7 registers the electronic key 2 to a new immobilizer ECU 6a and/or replacement immobilizer ECUs 6b and 6c. The electronic key registration system 7 stores the key ID code KID, the electronic key encryption key K, and the SEED code SC, which are stored in the electronic key 2, in an electronic key database 9b located at the data center 10 (FIG. 2). The electronic key database holds the key ID code KID, the electronic key encryption key K, and the SEED code SC for each electronic key 2. For each electronic key 2, the electronic key registration system 7 may store the key ID code KID, the electronic key encryption key K, and the SEED code SC. The electronic key registration system 7 stores the vehicle ID code VID, the vehicle encryption key VK, the key ID code KID, and the electronic key encryption key K in an ECU database 9a of the data center 10.

The electronic key 2 is registered to the immobilizer ECU 6 by storing, in the immobilizer ECU 6, the key ID code KID and the electronic key encryption key K that are the same as those stored in the electronic key 2. In this registration, the electronic key encryption key K stored in the electronic key 2 is not transmitted from the electronic key 2 to the immobilizer ECU 6. Instead, the immobilizer ECU 6 obtains the SEED code SC from the electronic key 2, generates the electronic key encryption key K from the SEED code SC, and stores the electronic key encryption key K in the immobilizer ECU 6. The immobilizer ECU 6 obtains and stores the key ID code KID of the electronic key 2 from the electronic key 2.

When the electronic key registration system 7 additionally registers an electronic key 2, the immobilizer ECU 6 and a registration tool 8 perform an additional electronic key registration step that differs depending on whether the registration is performed offline or online. Further, the contents stored in the memory 42 of the electronic key 2 in an additional electronic key manufacturing step performed before the additional key registration step differs depending on whether the additional registration is performed online or offline. For example, the memory 42 of the offline additional electronic key 2c stores all of the data necessary for verification in the additional electronic key manufacturing step. The memory 42 of the online additional electronic key 2b stores data excluding the SEED code SC in the additional electronic key manufacturing step.

In the same manner, a step that registers an electronic key 2 to the online replacement immobilizer ECU 6b differs depending on whether or not the immobilize ECU 6 and the registration tool 8 are online. For example, when online replacement ECU registration is performed, only the vehicle ID code VID and the vehicle encryption key VK is stored in the memory 69 of the online replacement immobilizer ECU 6b in a replacement ECU manufacturing step. When offline replacement ECU registration is performed, the key ID code KID and the electronic key encryption key K of each electronic key 2 registered to the immobilizer ECU prior to replacement in addition to the vehicle ID code VID and the vehicle encryption key VK from the database 9 are stored in the memory 69 of the offline replacement immobilizer ECU 6c in the replacement ECU manufacturing step. The immobilizer ECUs 6b and 6c may each be referred to as a replacement controller.

In the electronic key registration system 7, the registration tool 8 is connected to the vehicle, and the registration tool 8 switches an operation mode of the immobilizer ECU 6 to a registration mode to allow for registration of the electronic key 2 to the immobilizer ECU 6. The registration tool 8 includes a control unit 81, which controls the registration tool 8, an operation unit 82, which detects a registration operation carried out by a person performing registration, and a display unit 83, which displays the registration operation. When the registration tool 8 is set to an initial registration mode for registering a new electronic key 2 by, for example, a person performing the registration, the registration tool 8 provides the vehicle 1 with an initial registration signal that changes the operation mode of the immobilizer ECU 6 to the initial registration mode. Further, in response to the operation of the person performing the registration, the registration tool 8 provides the vehicle 1 with an additional registration signal for changing the immobilizer ECU 6 to an additional registration mode.

The immobilizer ECU 6 includes a mode switching unit 61 that switches operation modes. When provided with an initial registration signal from the registration tool 8, the mode switching unit 61 switches the operation mode to an initial registration mode. When provided with an additional registration signal from the registration tool 8, the mode switching unit 61 switches the operation mode to an additional registration mode.

The immobilizer ECU 6 includes a key ID writing unit 62 that writes the key ID code KID of the electronic key 2 that is to be registered to the memory 69. When the operation mode is switched to the initial registration mode, the key ID writing unit 62 writes the key ID code KID read from the electronic key 2 to the memory 69.

The immobilizer ECU 6 includes a key ID verification unit 63 that checks whether or not the key ID code KID registered to the memory 69 conforms to the key ID code KID stored in the electronic key 2. The key ID verification unit 63 transmits a key ID request signal from the coil antenna 5 to the electronic key 2 to check whether the key ID code KID stored in the electronic key 2 conforms to the key ID code KID stored in the key ID verification unit 63. The key ID verification unit 63 checks whether or not the key ID code KID in the key ID signal received from the electronic key 2 is correct.

The immobilizer ECU 6 includes a SEED reading unit 64 that reads a SEED code SC to generate an electronic key encryption key K stored in the electronic key 2. When the operation mode is switched to any of a number of registration modes, the SEED reading unit 64 transmits a SEED request signal, which requests for the SEED code, from the coil antenna 5 and obtains the SEED code from a SEED signal transmitted from the electronic key 2. When switched to the additional registration mode, the SEED reading unit 64 transmits the SEED request signal when necessary to retrieve the SEED code from the database 9. In the initial registration mode, when the SEED code SC is obtained, the SEED reading unit 64 transmits a SEED deletion signal to delete the SEED code SC from the electronic key 2.

The immobilizer ECU 6 includes a SEED generation request unit 65 that generates a SEED code SC from the electronic key encryption key K. When the operation mode is switched to the additional registration mode and a SEED code is not stored in the database 9, the SEED generation request unit 65 transmits a SEED generation signal so that the database 9 generates the SEED code SC.

The immobilizer ECU 6 includes an encryption key generation unit 66 that generates an electronic key encryption key K. When the immobilizer ECU 6 is in the initial registration mode, the encryption key generation unit 66 generates the electronic key encryption key K by performing a computation with the SEED code obtained by the SEED reading unit 64 and the key generation logic f read from the memory 69.

The immobilizer ECU 6 includes an encryption key registration unit 67 that registers the generated electronic key encryption key K and changes a flag. In the initial registration mode, the encryption key registration unit 67 stores, in the memory 69, the electronic key encryption key K generated by the encryption key generation unit 66 to register the electronic key encryption key K to the immobilizer ECU 6. In the initial registration mode, when an initial registration prohibition operation is detected after the electronic key encryption key K is stored, the encryption key registration unit 67 prohibits initial registration. One example of an initial registration restriction operation is an operation repeating on/off of the ignition switch 14 for twenty times. In the additional registration mode, the encryption key registration unit 67 stores the electronic key encryption key K and prohibits subsequent additional registrations.

The immobilizer ECU 6 includes a database updating unit 68 that stores the key ID code KID and the electronic key encryption key K, which are registered to the immobilizer ECU 6, to the database 9. When obtaining the key ID code KID and the electronic key encryption key K, the database updating unit 68 transmits a data update signal to the database 9 and updates the database 9.

The person performing registration, the registration tool 8, or the immobilizer ECU 6 retrieves the vehicle ID code in advance from the vehicle 1 that is subject to registration. For example, when the vehicle 1 detects a certain operation that requests for the vehicle ID code, the vehicle 1 shows a vehicle ID code on the display 15. When registering the additional electronic key 2b, the person performing registration inserts a registered electronic key 2, such as the initial electronic key 2a, into the key cylinder. Then, after immobilizer verification is accomplished, the vehicle ID code is obtained and shown on the display 15.

With reference to FIGS. 2 to 16, an initial registration for registering the initial electronic key 2a to an initially manufactured immobilizer ECU 6, an additional registration for registering online and offline additional electronic keys 2b and 2c to the initially manufactured immobilizer ECU 6, and a replacement ECU registration for registering the initial electronic key 2a to the online replacement immobilizer ECU 6b will be described.

Referring to FIG. 2, an initial manufacturing step is performed in a key manufacturing factory. In an initial manufacturing step, a vehicle ID code VID-A and a vehicle encryption key VK-A are stored in the memory 69 of the initially manufactured immobilizer ECU 6. In the memory 69, the initial registration flag indicates that initial registration is permitted, and the additional registration flag indicates that additional registration is permitted. In the initial manufacturing step, the memory 42 of the initially manufactured electronic key 2 stores a key ID code KID-1, an electronic key encryption key K-1, and a SEED code SC-1f, which is generated by through a computation performed with the electronic key encryption key K-1 and a key generation logic f.

In the initial manufacturing step, the ECU database 9a of the database 9 stores the vehicle ID code VID-A and the vehicle encryption key VK-A, which are stored in the initially manufactured immobilizer ECU 6. The electronic key database 9b of the database 9 stores the key ID code KID-1, the electronic key encryption key K-1, and the SEED code SC-1f, which are stored in the initially manufactured electronic key 2.

The registration of the initial electronic key 2a in the factory will now be described with reference to FIGS. 3, 4A and 4B. In the initial registration step, the registration tool 8 is connected to the vehicle 1 to perform a registration operation. The immobilizer ECU 6 is installed in the vehicle 1, and the immobilizer ECU 6 installed in the vehicle 1 is registered to the initial electronic key 2a.

Referring to FIG. 3, in the initial registration step, the immobilizer ECU 6 reads the key ID code KID-1 from the electronic key 2 and performs a computation with the SEED code SC-1f and the key generation logic f obtained from the electronic key 2 to generate the electronic key encryption key K-1. Then, the immobilizer ECU 6 stores the electronic key encryption key K-1 in the memory 69. The electronic key 2 deletes the SEED code SC-1f from the memory 42. The ECU database 9a of the data center 10 stores the key ID code KID-1 of the initial electronic key 2a in association with the vehicle encryption key VK-A.

Figure 4B:
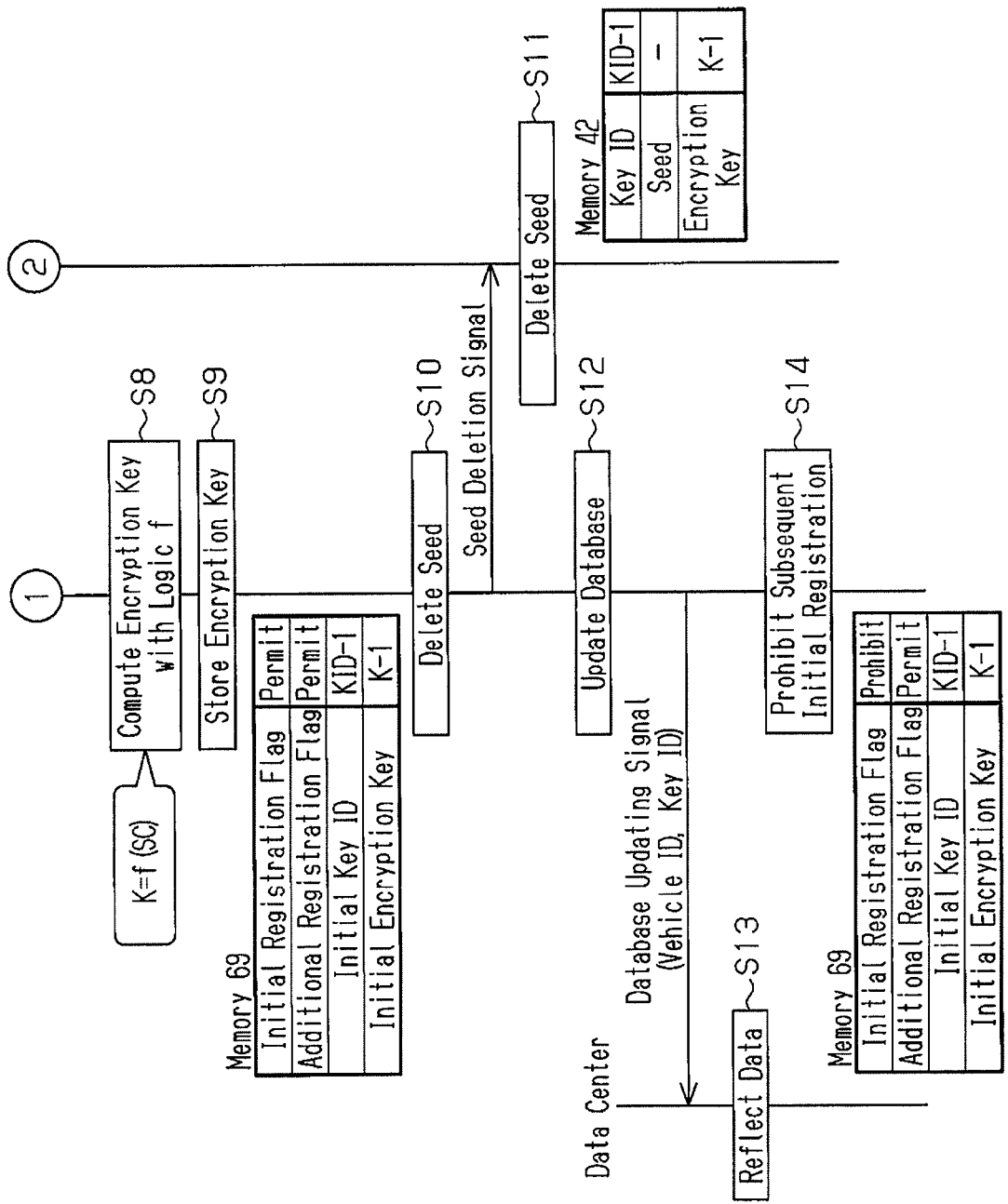

In detail, referring to FIGS. 4A and 4B, when the person performing registration operates the operation unit 82 to set initial registration, the registration tool 8 provides the immobilizer ECU 6 with an initial registration signal, which serves as an initial registration instruction (step S1). When receiving the initial registration signal, the mode switching unit 61 switches the immobilizer ECU 6 to an initial registration mode that registers the electronic key 2 to the immobilizer ECU 6 for the first time (step S2).

Then, to read the key ID code KID from the electronic key 2 (step S3), the immobilizer ECU 6 (key ID writing unit 62) transmits a key ID code KID that requests for the key ID code KID from the coil antenna 5 to the electronic key 2.

When the electronic key 2 receives the key ID request signal, the transponder 4 transmits a key ID signal, which includes the key ID code KID-1 stored in the memory 42, from the transmission-reception antenna 21 to the immobilizer ECU 6.

When the ECU 6 receives the key ID signal, the key ID writing unit 62 writes the key ID code KID-1, which is included in the key ID signal, to the memory 69.

Then, the SEED reading unit 64 of the immobilizer ECU 6 transmits a SEED request signal that requests for the SEED code SC from the coil antenna 5 (step S6).

When the electronic key 2 receives the SEED request signal, the transponder 4 transmits the SEED code SC-1f that is stored in the memory 42 from the transmission-reception antenna 21 (step S7).

The SEED reading unit 64 of the immobilizer ECU 6 obtains the SEED code SC-if from the received SEED signal. The encryption key generation unit 66 performs a computation with the SEED code SC-if and the key generation logic F obtained by the SEED reading unit 64 to generate an electronic key encryption key K-1. Thus, the immobilizer ECU 6 does not directly obtain the electronic key encryption key K-1 from the electronic key 2. Rather, the immobilizer ECU 6 obtains the SEED code SC-if to generate the electronic key encryption key K-1.

The immobilizer ECU 6 then stores the generated electronic key encryption key in the memory (step S9). More specifically, the encryption key registration unit 67 stores the electronic key encryption key K-1 generated by the encryption key generation unit 66 in the memory 69 to register the electronic key encryption key K-1 to the immobilizer ECU 6. The immobilizer ECU 6 uses the registered electronic key encryption key K-1 to allow for immobilizer verification to be performed with the electronic key 2.

When the electronic key encryption key K-1 is stored, the immobilizer ECU 6 deletes the SEED code SC stored in the electronic key 2 (step S10). More specifically, the SEED reading unit 64 transmits a SEED deletion signal from the transmission-reception antenna 21 to delete the SEED code SC. When receiving the SEED deletion signal, the electronic key 2 deletes the SEED code SC (step S13). That is, the transponder 4 deletes the SEED code SC-1f from the memory 42.

When the SEED code SC is deleted from the electronic key 2, the immobilizer ECU 6 updates the information of the data center 10 (step S12). More specifically, the database updating unit 68 provides a database update signal via the registration tool 8 to update the information of the data center 10. The data update signal includes a SEED code SC-1 used to generate the electronic key encryption key K-1. The registration tool 8 that receives the database update signal updates the information of the data center 10 through the network 20. The data center 10 reflects the data (step S13). More specifically, the ECU database 9a of the data center 10 reflects the information from the immobilizer ECU 6 on the key ID code KID-1, and reflects the information of the electronic key database 9b on the electronic key encryption key K-1.

When the initial registration prohibition operation is detected, the immobilizer ECU 6 prohibits initial registration (step S14). For example, when on/off operations of the ignition switch 14 are repeated twenty times, the encryption key registration unit 67 prohibits initial registration. Thus, the immobilizer ECU 6 cannot perform initial registration of the electronic key 2.

Additional registration of the electronic key 2 performed online will now be described with reference to FIGS. 5 to 7B.

Figure 5:
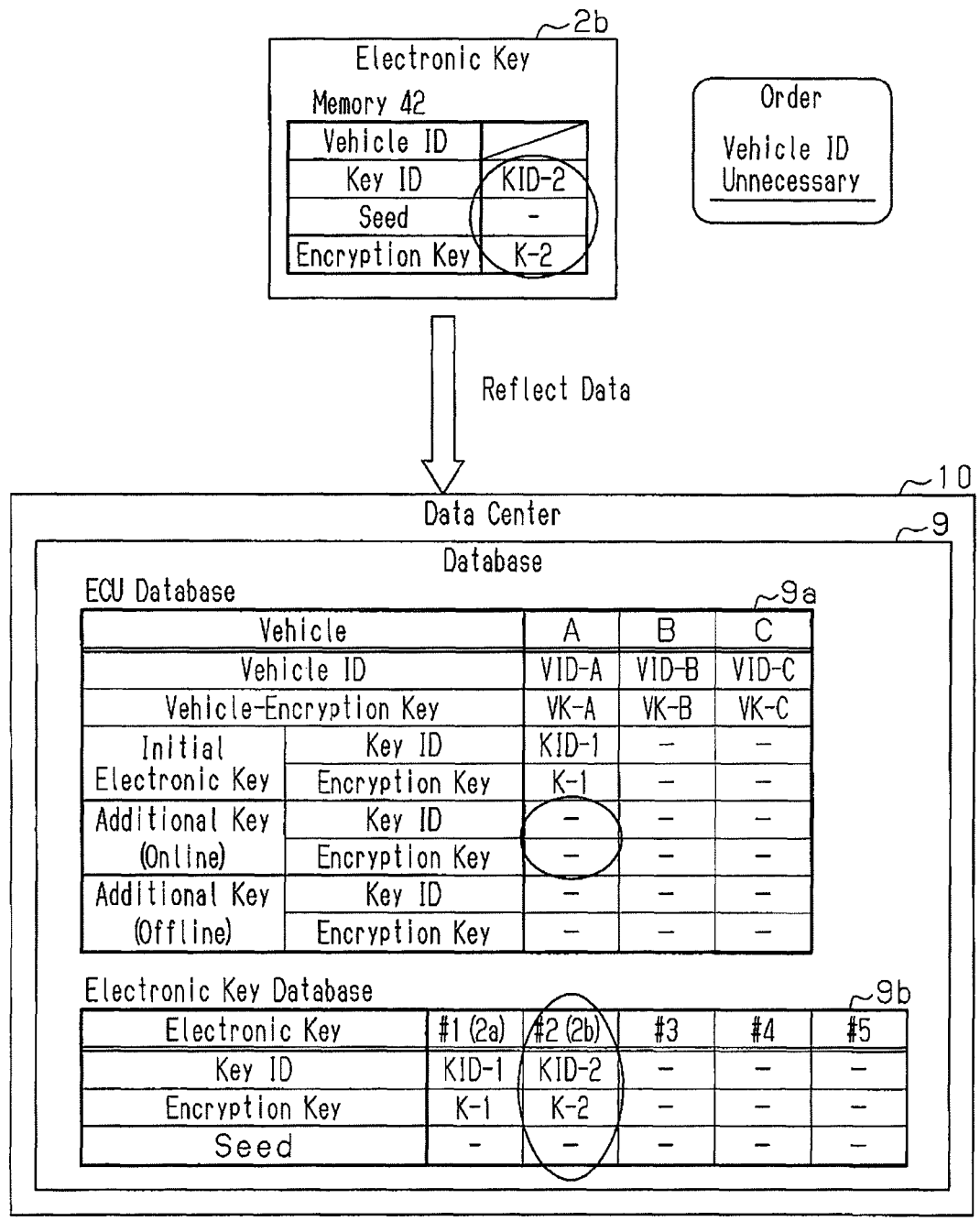
FIG. 5 is a schematic diagram illustrating manufacturing steps of an additional electronic key.

With reference to FIG. 5, a step for manufacturing an online additional electronic key 2b that may be registered online will now be described. The online additional electronic key 2b is manufactured in, for example, a key manufacturing factory. Since the online additional electronic key 2b can be registered online, an order sheet for manufacturing the online additional electronic key 2b does not have to include a vehicle ID code VID that specifies a vehicle. A key ID code KID-2 and an electronic key encryption key K-2 are stored in the memory 42 of the online additional electronic key 2b.

In an online additional electronic key manufacturing step, the database 9b of the data center 10 stores the key ID code KID-2 and the electronic key encryption key K-2, which are stored in the additional electronic key 2b. The database 9a of the data center 10 does not store the key ID code KID-2 and the electronic key encryption key K-2.

An online additional registration step performed at an approved location such as a maintenance garage will now be described with reference to FIGS. 6A to 7B. In the additional registration step, the registration tool 8 and the vehicle 1 are communicable with the data center 10 through the network 20. In the illustrated example, the registration tool 8 is connected to the vehicle 1, and the vehicle 1 is communicable with the data center 10 through the registration tool 8.

Figure 6A:
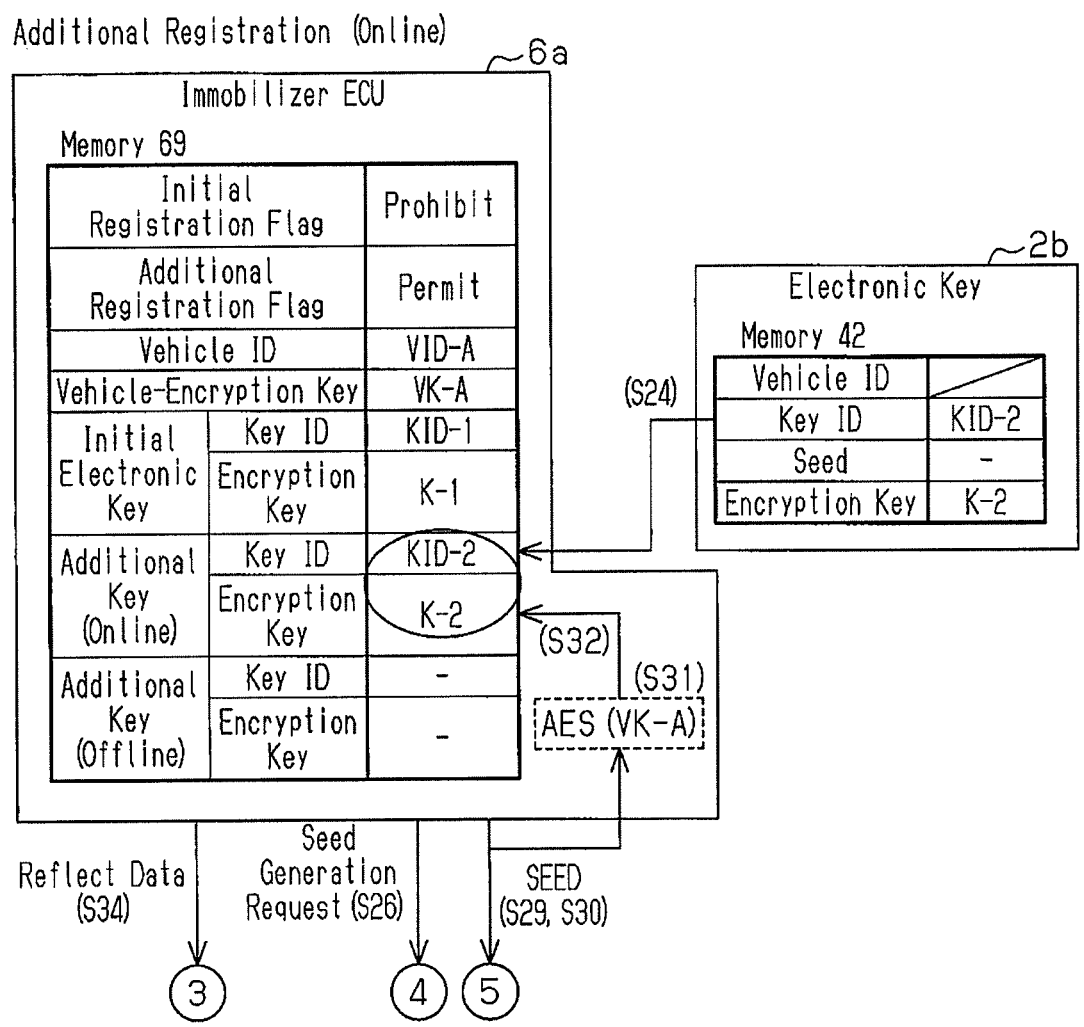
FIGS. 6A and 6B illustrate a schematic diagram illustrating registration steps of the additional electronic key.
Figure 6B:
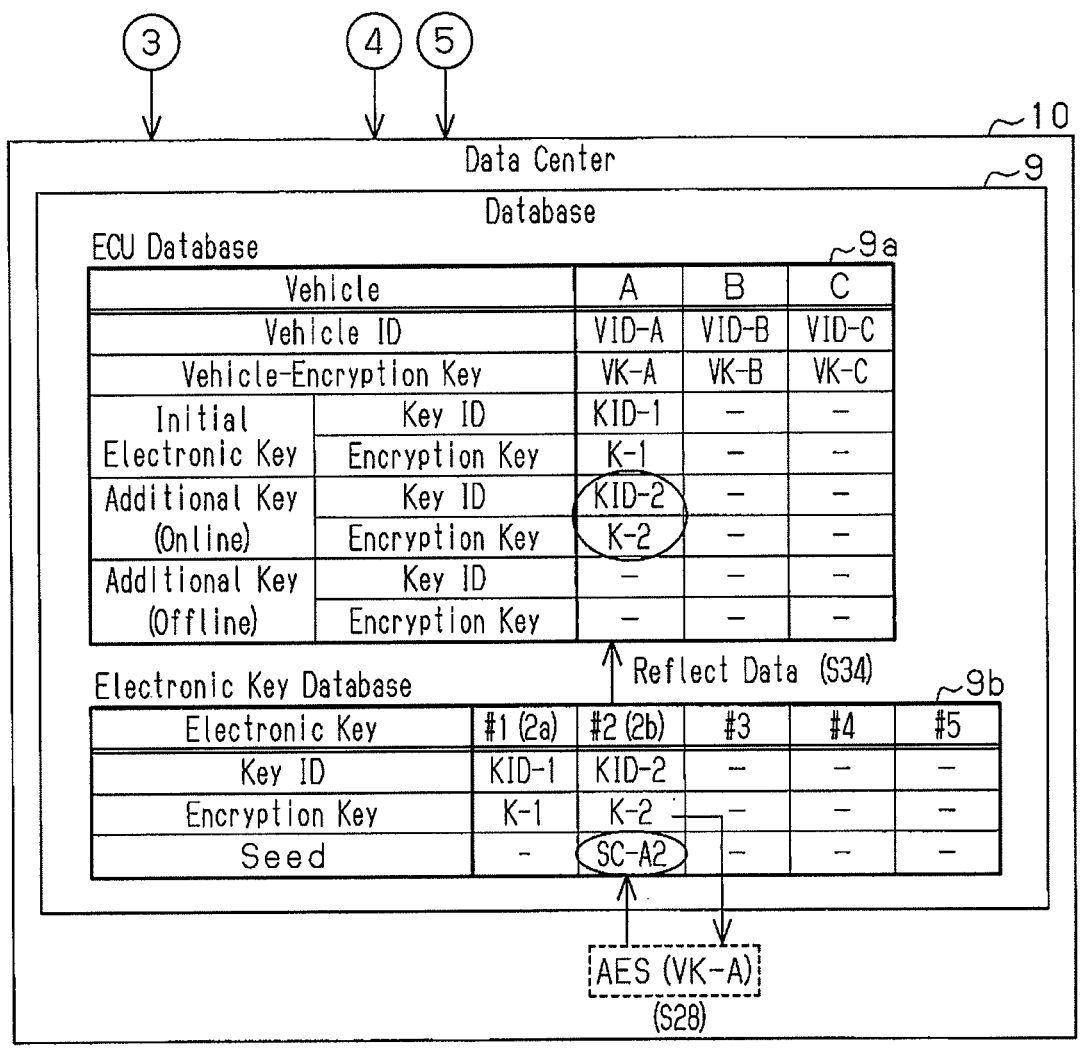

Referring to FIGS. 6A and 6B, in the online additional registration step, the immobilizer ECU 6 reads the key ID code KID-2 from the additional electronic key 2b. The immobilizer ECU 6 transmits a SEED code generation request, which includes the vehicle ID code VID-A and the key ID code KID-2 of the additional electronic key 2b to the data center 10. The data center 10 generates a SEED code SC-A2. The immobilizer ECU 6 obtains the generated SEED code SC-A2 from the data center 10, generates the electronic key electronic key encryption key K-2 from the obtained SEED code SC-A2, and stores the electronic key encryption key K-2 in the memory. Simultaneously or subsequently, the data center 10 stores the key ID code KID-2 of the additional electronic key 2b, which is obtained from the immobilizer ECU 6, and the electronic key encryption key K-2 of the additional electronic key 2b, which is obtained from the electronic key database 9b, in the ECU database 9a.

In detail, referring to FIGS. 6A and 6B, in the online additional registration step, the immobilizer ECU 6 reads the key ID code KID-2 from the additional electronic key 2b. The immobilizer ECU 6 transmits a SEED code generation request including the vehicle ID code VID-A and the additional electronic key ID code KID-2 to the data center 10. The data center 10 generates a SEED code SC-A2. The immobilizer ECU 6 obtains the generated SEED code SC-A2 from the data center 10, generates the electronic key encryption key K-2 from the obtained SEED code SC-A2, and stores the electronic key encryption key K-2 in the memory 69. Simultaneously or subsequently, the data center 10 stores the key ID code KID-2 of the additional electronic key 2b obtained from the immobilizer ECU 6 and the electronic key encryption key K-2 of the additional electronic key 2b obtained from the electronic key database 9b in the ECU database 9a.

Figure 7A:
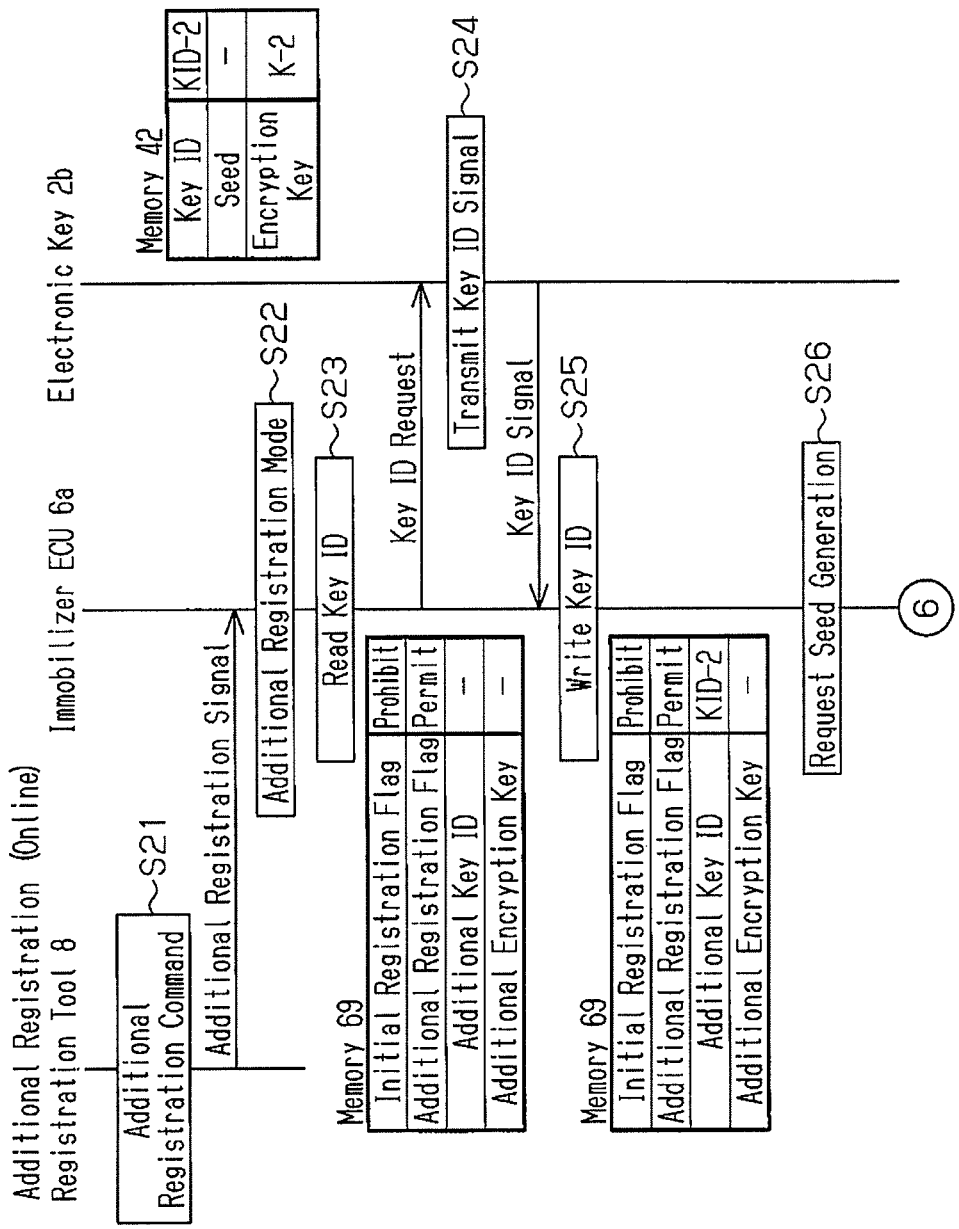
FIGS. 7A and 7B illustrate a sequence chart of the registration steps of the additional electronic key.
Figure 7B:
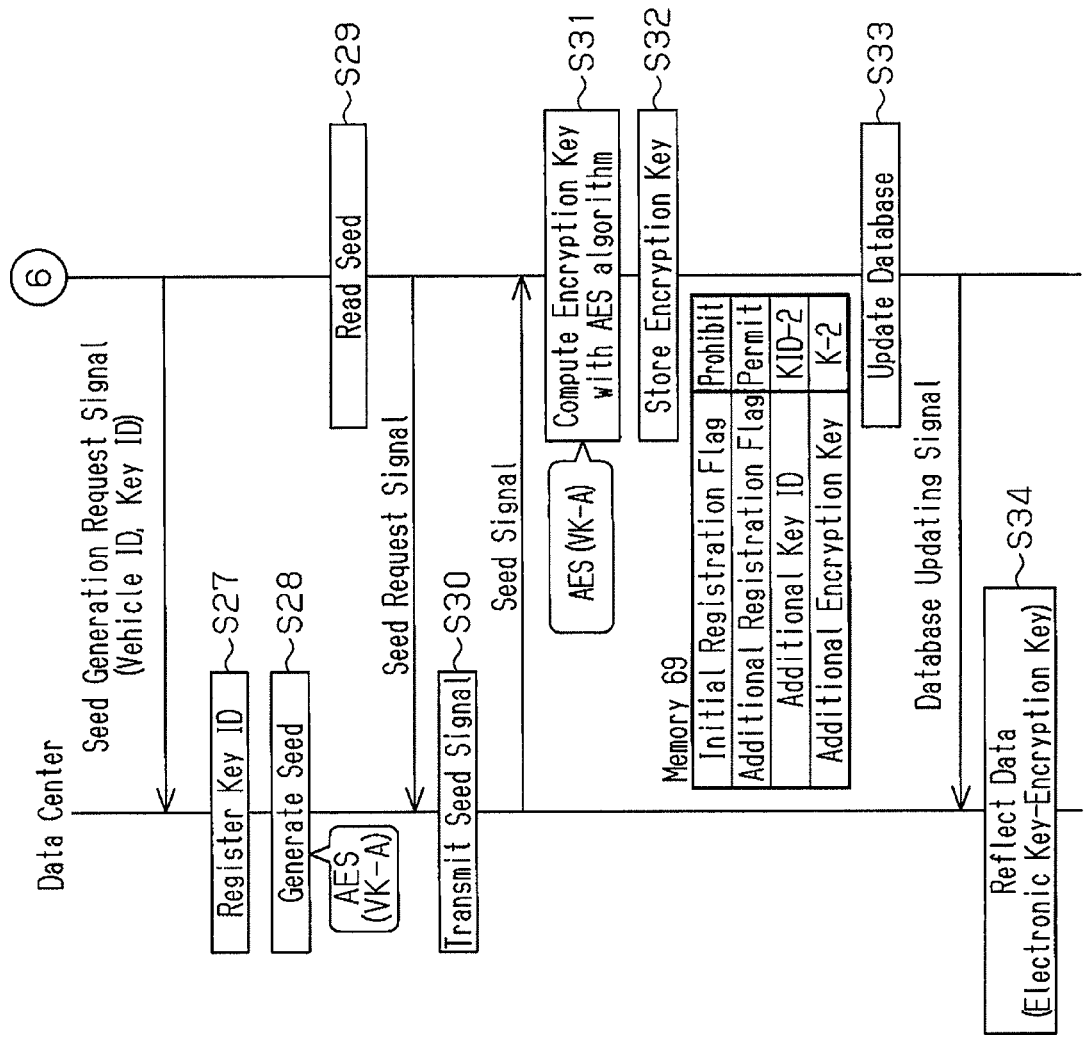

In detail, as shown in FIGS. 7A and 7B, when a person performing the registration operates the operation unit 82 and sets additional registration, the registration tool 8 provides the immobilizer ECU 6 with an additional registration signal as an additional registration instruction (step S21). When receiving the additional registration signal, the immobilizer ECU 6 switches the operation mode to the additional registration mode (step S22). That is, the mode switching unit 61 switches to the additional registration mode that additionally registers an electronic key 2 to the immobilizer ECU 6.

The immobilizer ECU 6 reads the key ID code KID (step S23). That is, the key ID writing unit 62 transmits a key ID request signal that requests for the key ID code KID from the coil antenna 5.

When receiving the key ID request signal, the electronic key 2 transmits a key ID signal including the key ID code KID (step S24). That is, the transponder 4 transmits a key ID signal including the key ID code KID-2 stored in the memory 42 from the transmission-reception antenna 21 to the immobilizer ECU 6.

When receiving the key ID signal, the immobilizer ECU 6 writes the key ID code KID, which is included in the key ID signal (step S25). That is, the key ID writing unit 62 writes the key ID code (KID-2), included in the key ID signal, to the memory 69.

When writing the key ID code KID, the immobilizer ECU 6 requests the data center 10 to generate the SEED code SC (step S26). More specifically, since the SEED code SC is not stored in the data center 10, the SEED generation request unit 65 transmits a SEED generation request signal to instruct the data center 10 to generate the SEED code SC. The SEED generation request signal includes the vehicle ID code VID-A, which specifies the vehicle, and the key ID code KID-2 of the additional electronic key.

When receiving the SEED generation request signal, the data center 10 registers the key ID code KID (step S27). More specifically, the data center 10 stores the key ID code KID-2, which is included in the SEED generation request signal, in the ECU database 9a. The data center 10 generates a SEED code SC, which corresponds to the additional electronic key 2b. That is, the data center 10 generates the SEED code SC-A2 with a vehicle encryption key VK-A from the stored electronic key encryption key K-2 in compliance with the encryption standard K-2.

The immobilizer ECU 6 reads the SEED code SC (step S29). That is, the SEED reading unit 64 transmits a SEED request signal that requests for the SEED code SC to the data center 10.

When receiving the SEED request signal, the data center 10 transmits the SEED signal (step S30). The data center 10 transmits a SEED signal, which includes the generated SEED code SC-A2, to the immobilizer ECU 6.

The immobilizer ECU 6 calculates the electronic key encryption key K in compliance with the encryption standard AES (step S31). That is, the SEED reading unit 64 obtains the SEED code SC-A2 by receiving the SEED signal. The encryption key generation unit 66 generates the electronic key encryption key K-2 with the vehicle encryption key VK-A from the SEED code SC-A2 obtained from the SEED reading unit 64 in compliance with the encryption standard AES. Thus, the immobilizer ECU 6 does not directly obtain the electronic key encryption key K-2 from the data center 10. Rather, the immobilizer ECU 6 obtains the SEED code SC-A2 to generate the electronic key encryption key K-2.

Then, the immobilizer ECU 6 stores the generated electronic key encryption key K in the memory 69 (S32). That is, the encryption key registration unit 67 stores the electronic key encryption key K-2, which is generated by the encryption key generation unit 66, in the memory 69 to register the electronic key encryption key K-2 to the immobilizer ECU 6.

The immobilizer ECU 6 may perform immobilizer verification by using the registered electronic key encryption key K-2.

When the immobilizer ECU 6 stores the electronic key encryption key K-2 of the additional electronic key 2b, the immobilizer ECU 6 updates the information of the data center S33. More specifically, the database updating unit 68 provides the data center 10 with a database update signal to update the information of the data center 10. The data center 10 stores the electronic key encryption key K-2 of the electronic key database 9b to the ECU database 9a in order to reflect the data of the electronic key database 9b to the ECU database 9a (step S34).

The additional registration of an electronic key 2 under an offline environment will now be described with reference to FIGS. 8 to 10.

Since the online additional electronic key 2b can be registered online, an order sheet for manufacturing the online additional electronic key 2b does not have to include a vehicle ID code VID that specifies a vehicle. A key ID code KID-2 and an electronic key encryption key K-2 are stored in the memory 42 of the online additional electronic key 2b.

Figure 8:
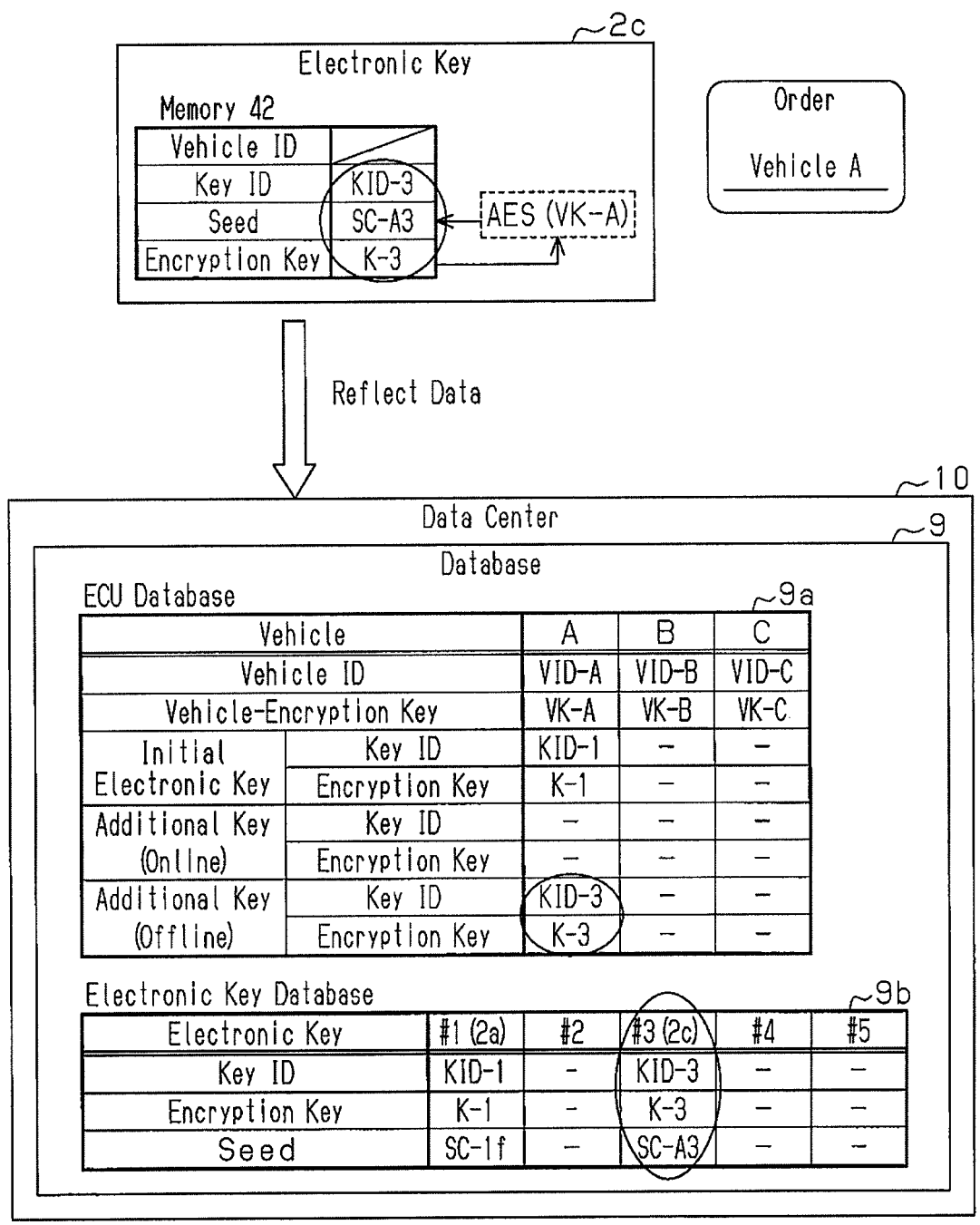
FIG. 8 is a schematic diagram illustrating manufacturing steps of an additional electronic key.

First, referring to FIG. 8, an offline additional electronic key 2c, which may be registered offline, is manufactured in a key manufacturing factory. In an offline additional key manufacturing step, the registration tool 8 cannot access the data center 10. Thus, the registration tool 8 locates the immobilizer ECU 6 to which registration is performed in accordance with the vehicle ID code VID indicated on the order sheet. The memory 42 of the offline additional electronic key 2c stores a key ID code KID-3, an electronic key encryption key K-3, and a SEED code SC-A3, which is generated with the vehicle encryption key VK-A from the electronic key encryption key K-3 in compliance with the encryption key standard.

In an offline additional key manufacturing step, the ECU database 9a of the data center 10 stores the key ID code KID-3 of the offline additional electronic key 2c and the electronic key encryption key K-3. The electronic key database 9b of the data center 10 stores the key ID code KID-3 and the electronic key encryption key K-3, which are stored in the offline additional electronic key 2c, and the SEED code A-3.

The registration of the offline additional electronic key 2c performed online in a maintenance garage or the like will now be described with reference to FIGS. 9 and 10. In an offline additional registration step, the registration tool 8 that is not connected to the network 20 is connected to the vehicle 1.

Referring to FIG. 9, in the offline additional registration step, the ECU 6 reads the key ID code KID-3 from the offline additional electronic key 2c. The immobilizer ECU reads the SEED code SC-A3 from the offline additional electronic key 2c, generates the electronic key encryption key K-3 from the obtained SEED code SC-A3, and stores the electronic key encryption key K-3 in the memory 69. The immobilizer ECU 6 cannot access the database 9 and thus does not update the database 9.

Figure 10:
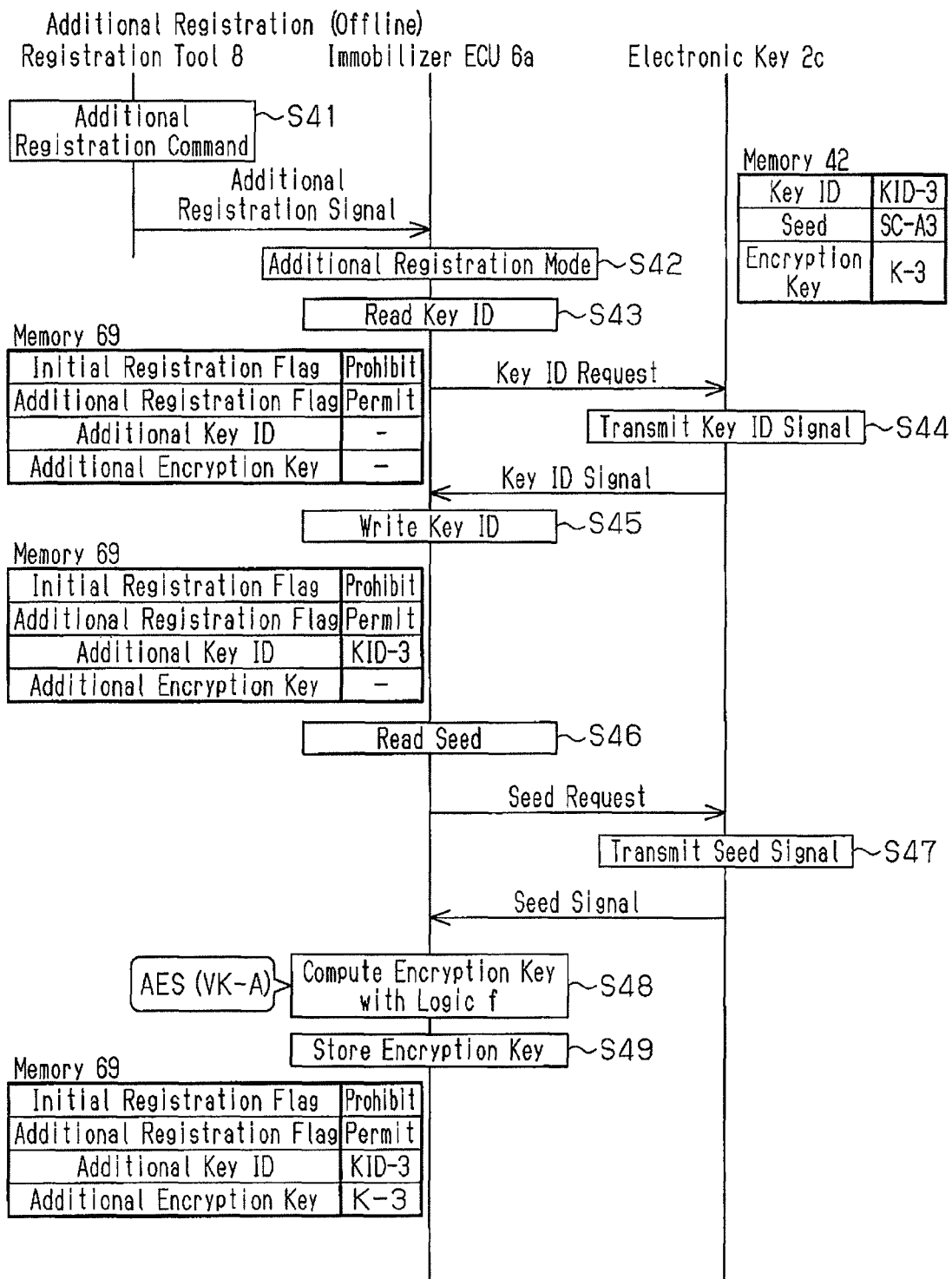
FIG. 10 is a sequence chart of the registration steps of the additional electronic key.

In detail, referring to FIG. 10, when the person performing the registration operates the operation unit 82 and sets additional registration, the registration tool 8 provides the immobilizer ECU 6 with an additional registration signal as an additional registration instruction (step S41). When receiving the additional registration signal, the immobilizer ECU 6 switches the operation mode to the additional registration mode (step S42). That is, the mode switching unit 61 switches to the additional registration mode that additionally registers an electronic key 2 to the immobilizer ECU 6.

The immobilizer ECU 6 reads the key ID code KID from the offline additional electronic key 2c (step S43). That is, the key ID writing unit 62 transmits a key ID request signal that requests for the key ID code KID to the offline additional electronic key 2c from the coil antenna 5.

When receiving the key ID request signal, the offline additional electronic key 2c transmits a key ID signal including the key ID code KID (step S44). That is, the transponder 4 transmits a key ID signal including the key ID code KID-3 stored in the memory 42 from the transmission-reception antenna 21 to the immobilizer ECU 6.

When receiving the key ID signal, the immobilizer ECU 6 writes the key ID code KID, which is included in the key ID signal (step S45). That is, the key ID writing unit 62 writes the key ID code (KID-3) of the offline additional electronic key 2c, included in the key ID signal, to the memory 69.

When writing the key ID code KID-3, the immobilizer ECU 6 reads the SEED code SC (step S46). That is, the SEED reading unit 64 transmits a SEED request signal that requests for the SEED code SC to the electronic key 2 from the transmission-reception antenna 21.

When receiving the SEED request signal, the electronic key 2 transmits the SEED signal (step S47).

The immobilizer ECU 6 calculates the electronic key encryption key K-3 in compliance with the encryption standard AES (step S48). That is, the SEED reading unit 64 obtains the SEED code SC-A3 by receiving the SEED signal. The encryption key generation unit 66 generates the electronic key encryption key K-3 with the vehicle encryption key VK-A from the SEED code SC-A3 obtained from the SEED reading unit 64 in compliance with the encryption standard AES. Thus, the immobilizer ECU 6 does not directly obtain the electronic key encryption key K-3 from the data center 10. Rather, the immobilizer ECU 6 obtains the SEED code SC-A3 to generate the electronic key encryption key K-3.

Then, the immobilizer ECU 6 stores the generated electronic key encryption key K-3 in the memory 69 (step S49). That is, the encryption key registration unit 67 stores the electronic key encryption key K-3, which is generated by the encryption key generation unit 66, in the memory 69 to register the electronic key encryption key K-3 to the immobilizer ECU 6. The immobilizer ECU 6 may perform immobilizer verification by using the registered electronic key encryption key K-3.

The registration of an electronic key 2 to a replaced immobilizer ECU 6 under an online environment will now be described with reference to FIGS. 11 to 13B.

Referring to FIG. 11, a replacement controller manufacturing step (replacement ECU manufacturing step) of manufacturing an online replacement immobilizer ECU 6b is performed in an ECU manufacturing factory. In the replacement ECU manufacturing step, registration may be performed under an online environment. Thus, there is no need to indicate the vehicle ID code VID used to specify the vehicle on an order sheet. A new vehicle ID code VID-B is written to the memory 69 of the immobilizer ECU 6, and a vehicle encryption key K-B, which corresponds to the vehicle ID code V-ID, from the data center 10 is written to the memory 69 of the immobilizer ECU 6.

The registration of an electronic key 2 to an immobilizer ECU 6 that has been replaced in a maintenance garage or the like under an online environment will now be described with reference to FIGS. 12 to 13B. In a replacement controller registration step (replacement ECU registration step), the registration tool 8 that is connected to the network 20 is connected to the vehicle 1 so that the immobilizer ECU 6 may access the database 9a.

Figure 12A:
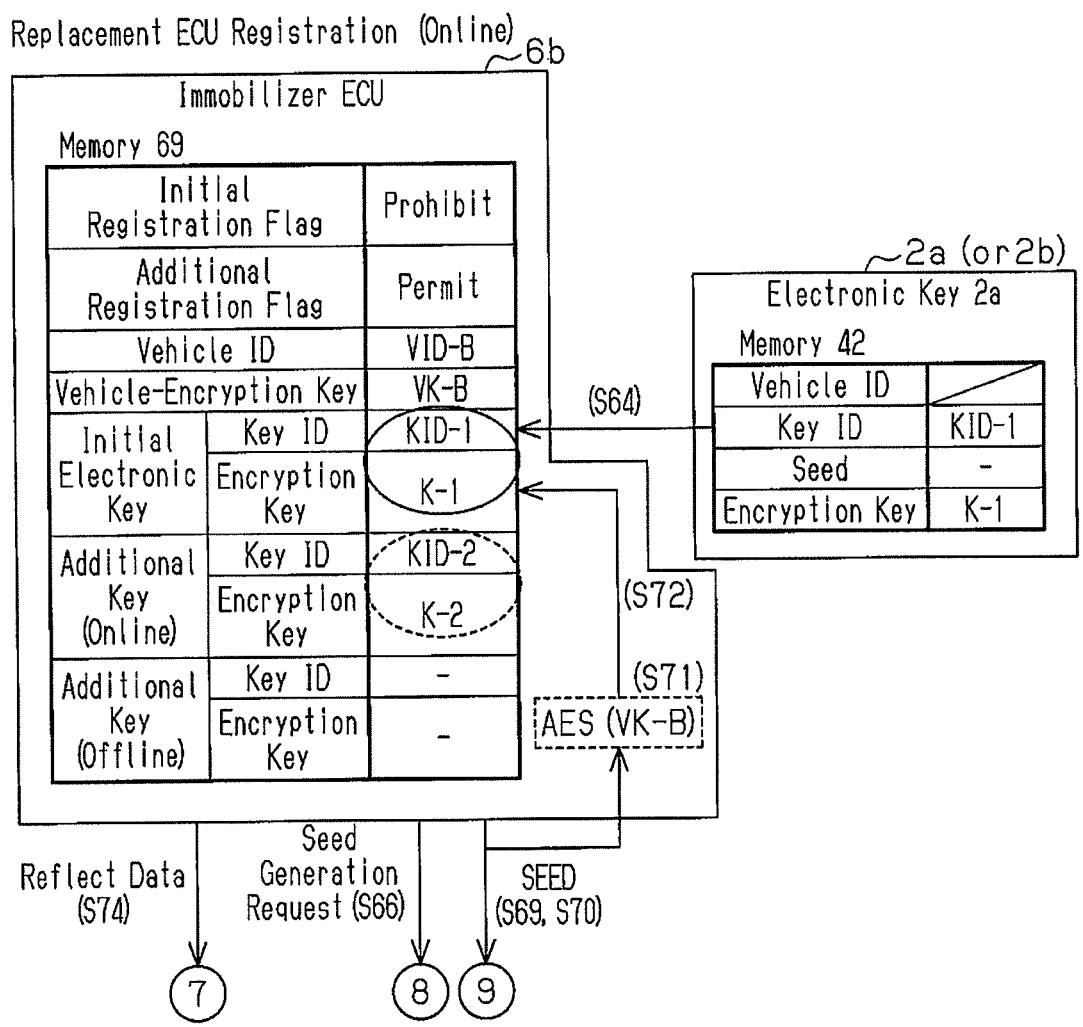
FIGS. 12A and 12B illustrate a schematic diagram illustrating registration steps of the replacement ECU.
Figure 12B:
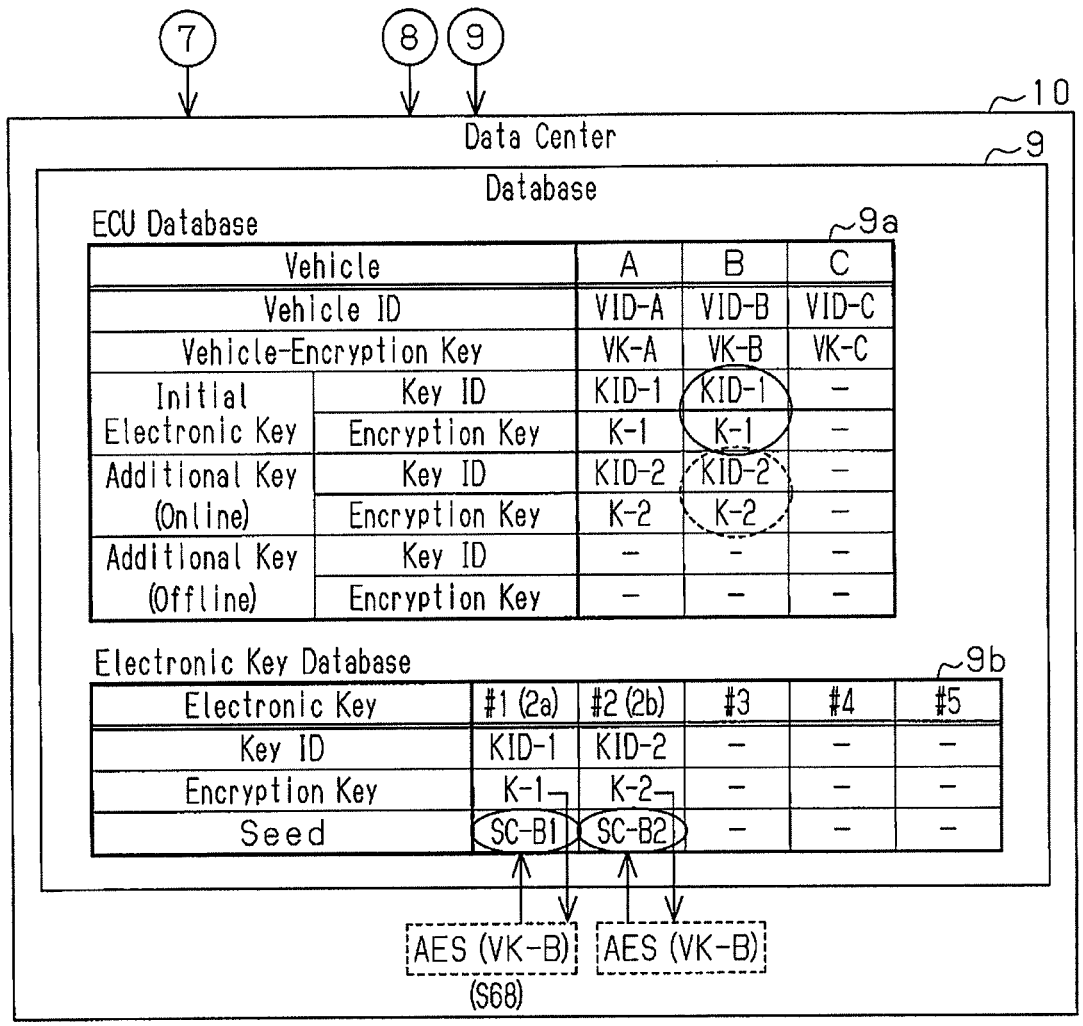

First, referring to FIGS. 12A and 12B, in the replacement ECU registration step under an online environment, the replaced immobilizer ECU 6 reads the key ID code KID-1 from the initial electronic key 2a. The immobilizer ECU 6 instructs the data center 10 to generate a SEED code SC-B1. Then, the immobilizer ECU 6 reads the generated SEED code SC-B1, generates the electronic key encryption key K-1 from the obtained SEED code SC-B1, and stores the electronic key encryption key K-1 in the memory 69. The ECU database 9a of the data center 10 stores the key ID code KID-1 of the electronic key 2 that is registered when generating the SEED code SC-B1. Further, the ECU database 9a stores the electronic key encryption key K-1 of the electronic key 2 registered from the electronic key database 9b. The electronic key 2 initially registered to the initially manufactured immobilizer ECU 6 and the electronic key 2 additionally registered to the initially manufactured immobilizer ECU 6 are registered in the same manner to the replaced immobilizer ECU 6.

Figure 13A:
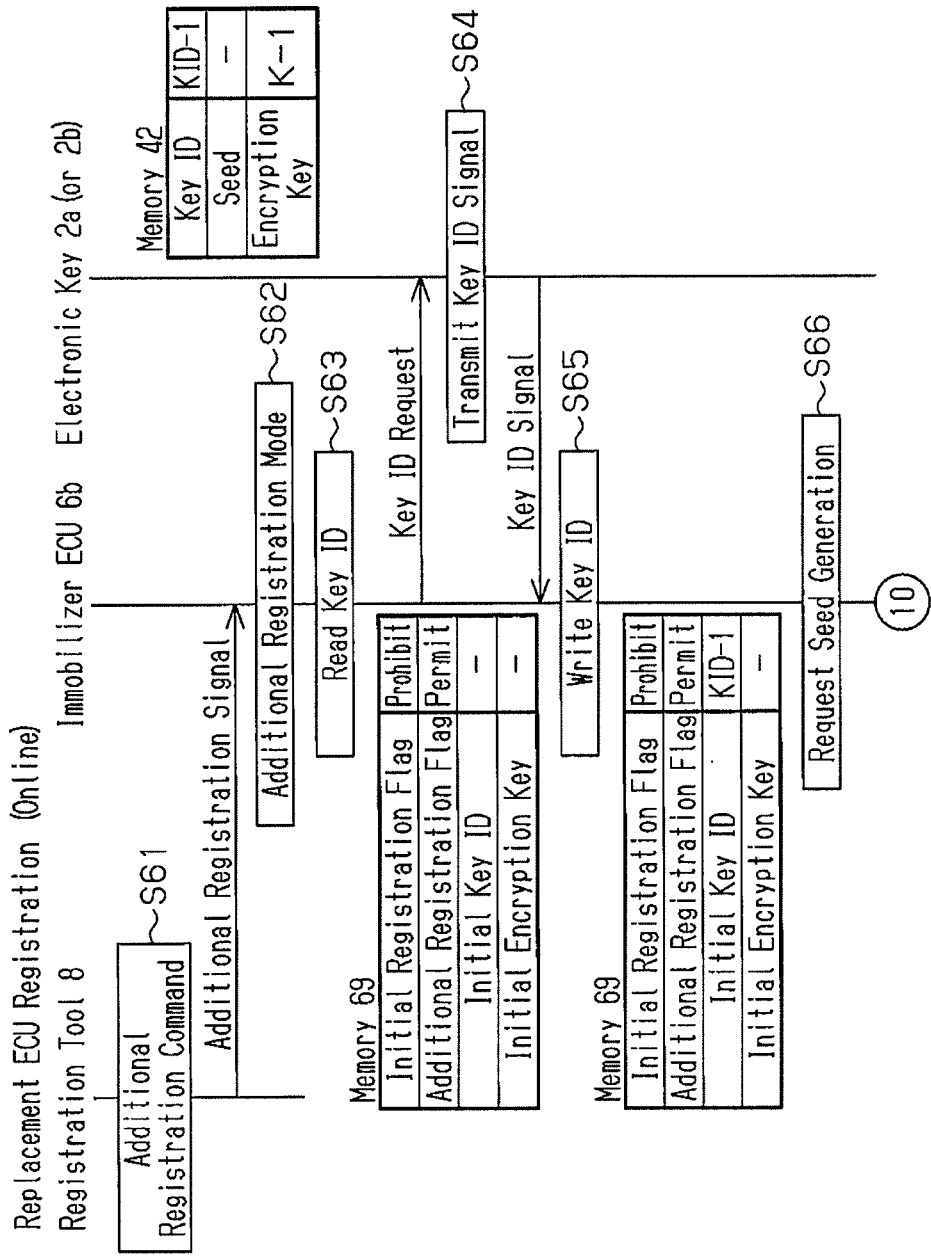
FIGS. 13A and 13B illustrate a sequence chart of the registration steps of the replacement ECU.
Figure 13B:
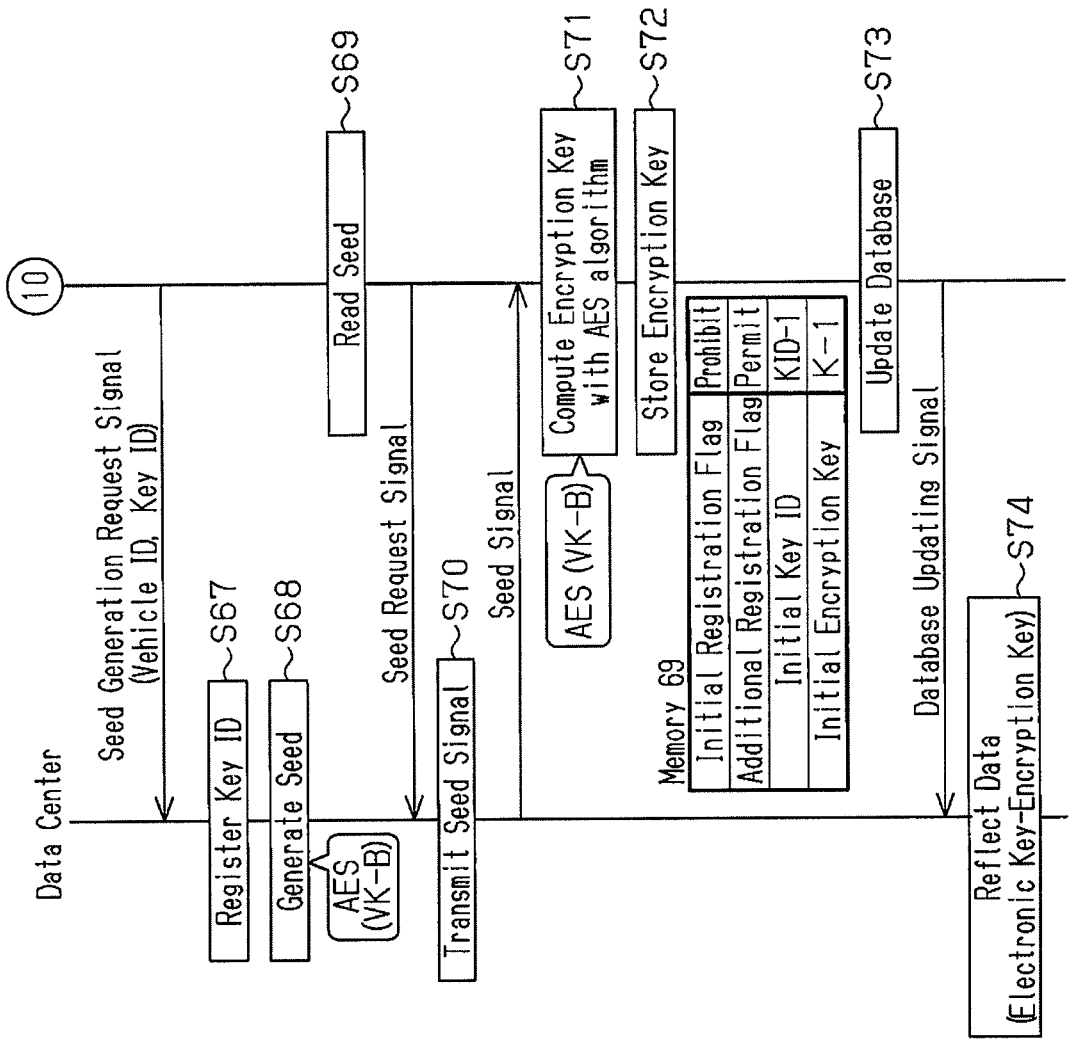

In detail, referring to FIGS. 13A and 13B, in the replacement ECU registration step of registering the replaced immobilizer ECU 6 to the electronic key 2, when a person performing the registration operates the operation unit 82 to set additional registration, the registration tool 8 provides the immobilizer ECU 6 with an additional registration signal as an additional registration instruction (step S61). When receiving the additional registration signal, the immobilizer ECU 6 switches the operation mode to the additional registration mode (step S62). That is, the mode switching unit 61 switches to the additional registration mode that registers the electronic key 2 to the replaced immobilizer ECU 6 for the first time.

The immobilizer ECU 6 reads the key ID code KID stored in the electronic key 2 (step S63). That is, the key ID verification unit 63 transmits a key ID request signal from the coil antenna 5 to check the key ID code KID-1 stored in the electronic key 2.

When receiving the key ID request signal, the electronic key 2 transmits a key ID signal including the key ID code KID (step S64). That is, the transponder 4 transmits a key ID signal including the key ID code KID-1 stored in the memory 42 to the immobilizer ECU 6 from the transmission-reception antenna 21.

When receiving the key ID signal, the immobilizer ECU 6 writes the key ID code KID, which is included in the key ID signal (step S65). That is, the key ID writing unit 62 writes the key ID code KID-1, included in the key ID signal, to the memory 69.

When writing the key ID code KID, the immobilizer ECU 6 requests the data center 10 to generate the SEED code SC (step S66). More specifically, since the SEED code SC is not stored in the data center 10, the SEED generation request unit 65 transmits a SEED generation request signal to instruct the data center 10 generate the SEED code SC-B1. The SEED generation request signal includes the vehicle ID code VID-A, which is used to specify the vehicle, and the key ID code KID-1 of the electronic key 2 that is to be registered.

When receiving the SEED generation request signal, the data center 10 registers the key ID code KID (step S67). That is, the data center 10 stores the key ID code KID-1, which is included in the SEED generation request signal, in the ECU database 9a. The data center 10 generates the SEED code SC corresponding to the additionally registered electronic key 2 (step S68). That is, the data center 10 generates the SEED code SC-B1 from the stored electronic key encryption key K-1 with the vehicle encryption key VK-B in compliance with the encryption standard AES.

The immobilizer ECU 6 reads the SEED code SC (step S69). That is, the SEED reading unit 64 transmits a SEED request signal that requests for the SEED code SC to the data center 10.

When receiving the SEED request signal, the data center 10 transmits the SEED signal (step S70). The data center 10 transmits a SEED signal including the generated SEED code SC-B1 to the immobilizer ECU 6.

The immobilizer ECU 6 calculates the electronic key encryption key K-1 in compliance with the encryption standard AES (step S71). That is, the SEED reading unit 64 obtains the SEED code SC-B1 by receiving the SEED signal. The encryption key generation unit 66 generates the electronic key encryption key K-1 with the vehicle encryption key VK-B from the SEED code SC-B1 obtained from the SEED reading unit 64 in compliance with the encryption standard AES. Thus, the immobilizer ECU 6 does not directly obtain the electronic key encryption key K-1 from the data center 10. Rather, the immobilizer ECU 6 obtains the SEED code SC-B1 to generate the electronic key encryption key K-1.

Then, the immobilizer ECU 6 stores the generated electronic key encryption key K-3 in the memory 69 (step S72). That is, the encryption key registration unit 67 stores the electronic key encryption key K-1, which is generated by the encryption key generation unit 66, in the memory 69 to register the electronic key encryption key K-1 to the immobilizer ECU 6. The immobilizer ECU 6 may perform immobilizer verification by using the registered electronic key encryption key K-1.

The immobilizer ECU 6 then stores the electronic key encryption key K-1 of the registered electronic key 2 and updates the information of the data center 10 (step S73). That is, the database updating unit 68 provides the data center 10 with a database update signal to update the information of the data center 10. The data center 10 reflects the data of the electronic key database 9b to the ECU database 9a (step S74). That is, the data center 10 stores the electronic key encryption key K-1 of the electronic key database 9b to the ECU database 9a.

Registration of an electronic key 2 to the offline replacement immobilizer ECU 6c will now be described with reference to FIGS. 14 to 16.

Referring to FIG. 14, the offline replacement immobilizer ECU 6c is manufactured in an ECU manufacturing factory. In an offline replacement ECU manufacturing step, the registration tool 8 cannot access the data center 10. Thus, the additionally registered immobilizer ECU 6 is recognized in accordance with the vehicle ID code VID indicated on an order sheet. The memory 69 of the offline replacement immobilizer ECU 6c stores the vehicle ID code VID-A of the vehicle 1 to which registration is to be performed and the vehicle encryption key VK-A corresponding to the vehicle ID code VID-A that are obtained, for example, offline, from the data center 10. The memory 69 of the immobilizer ECU 6 stores the key ID code KID-1 of the initial electronic key 2a, the electronic key encryption key K-1, the key ID code KID-3 of the additional electronic key 2b, and the electronic key encryption key K-3.

The registration of an electronic key 2 to the offline replacement immobilizer ECU 6c performed in a maintenance factory or the like will now be described with reference to FIGS. 15 and 16. In a replacement ECU registration step, the registration tool 8, which is disconnected from the network 20, is connected to the vehicle 1. Accordingly, the immobilizer ECU 6 cannot communicate with the data center 10.

Referring to FIG. 15, in the offline replacement ECU registration step, the offline replacement immobilizer ECU 6c reads the key ID code (in the illustrated example, KID-1) of at least one of the electronic keys 2, and checks whether or not the key ID code is the same as at least one of the key ID codes (in the illustrated example, KID-1 and KID-2) stored in the memory 69 of the offline replacement immobilizer ECU 6c. When there is a matching key ID code, the immobilizer ECU 6 registers the electronic key 2. In the illustrated example, the same tasks may be performed for the offline additional electronic key 2c so that all of the electronic keys (2a and 2c) registered to the immobilizer ECU 6a prior to replacement are registered to the offline replacement immobilizer ECU 6c.

Figure 16:
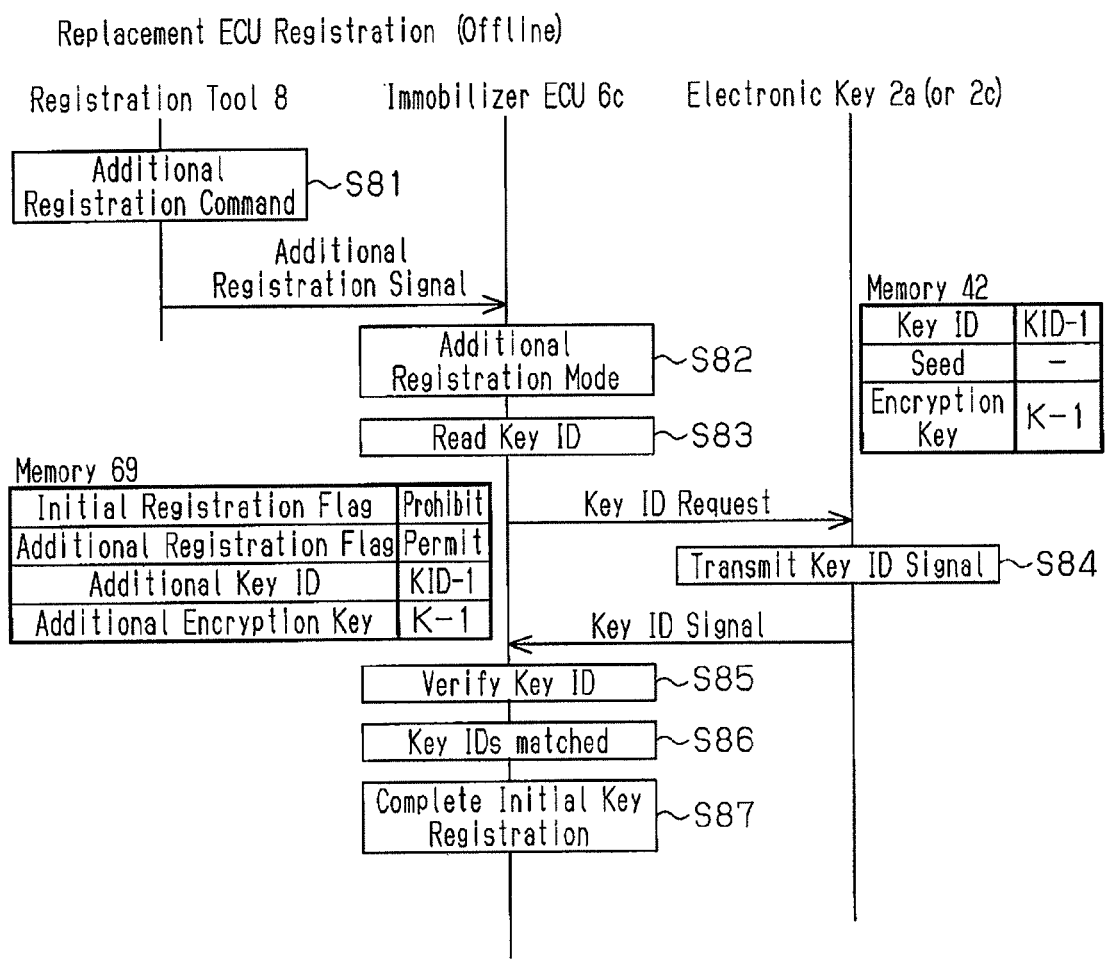
FIG. 16 is a sequence chart of the registration steps of the replacement ECU.

In detail, referring to FIG. 16, when an additional registration operation is performed with the operation unit 82, the registration tool 8 provides the immobilizer ECU 6 with an additional registration signal (step S81). When receiving the additional registration signal, the immobilizer ECU 6 switches the operation mode to the additional registration mode (step S82). That is, the mode switching unit 61 switches to the additional registration mode that registers the electronic key 2 to the offline replacement immobilizer ECU 6c.

The offline replacement immobilizer ECU 6c reads the key ID code KID stored in the electronic key 2 (step S83). That is, the key ID verification unit 63 transmits a key ID request signal from the coil antenna 5.

When receiving the key ID request signal, the electronic key 2 transmits a key ID signal (step S84). That is, the transponder 4 transmits a key ID signal including the key ID code KID-1 stored in the memory 42 to the offline replacement immobilizer ECU 6c from the transmission-reception antenna 21.

When receiving the key ID signal, the offline replacement immobilizer ECU 6c checks the key ID code KID included in the key ID signal (step S85). When there is a matching key ID code, the offline replacement immobilizer 6c ends the registration (step S87).

In this manner, the electronic key registration system 7 is capable of registering the electronic key 2 to the immobilizer ECU 6 both online and offline. In the electronic key registration system 7, the immobilizer ECU 6 obtains the SEED code SC from the electronic key 2 or the data center 10 and generates the electronic key encryption key K from the SEED code SC. The electronic key encryption key K is not transmitted through wireless communication to the immobilizer ECU 6 from the electronic key 2 and the data center 10. Thus, it is difficult for someone to obtain the electronic key encryption key K. The vehicle ID code VID-A registered beforehand to the immobilizer ECU 6 is written to the electronic key 2, the immobilizer ECU 6 obtains the SEED code SC-1f stored beforehand in the electronic key 2, the immobilizer ECU 6 performs a computation with the SEED code SC-1f and the key generation logic f to generate the electronic key encryption key K-1, and the immobilizer ECU 6 stores the electronic key encryption key K-1.

After initial registration, the electronic key encryption key K-1 of the initial electronic key 2a is generated with the key generation logic f. Then, the SEED code SC-1f, which is stored in the electronic key 2, is deleted from the electronic key 2. Thus, when attempting to register the initially registered electronic key 2 to another vehicle, the SEED code SC-if cannot be obtained from the electronic key 2. This facilitates registration while maintaining a certain security level.

The first embodiment has the advantages described below.

(1) The online immobilizer ECU 6 obtains the SEED code SC-A2 generated from the electronic key encryption key K-2, which is stored in the data center 10, generates the electronic key encryption key K-2 from the SEED code SC-A2, and stores the immobilizer ECU 6. The offline immobilizer ECU 6 cannot communicate with the data center 10. Thus, the immobilizer ECU 6 generates the electronic key encryption key K-3 from the SEED code SC-A3, and stores the electronic key encryption key K-3 in the immobilizer ECU 6. In this manner, the electronic key registration system 7 allows for both online and offline registration of the electronic key 2 to the immobilizer ECU 6. If there is a plan for registering the electronic key 2 offline, the offline additional electronic key 2b is used. When manufacturing the offline additional electronic key 2b, the key ID code KID and the electronic key encryption key K of the offline additional electronic key 2b are stored in the data center 10. Thus, when the registration of the electronic key 2 is subsequently performed offline, the key ID code KID and the electronic key encryption key K of the offline additional electronic key 2b can be stored in the data center 10. This facilitates registration while maintaining a certain security level.

(2) In the initial manufacturing step, the immobilizer ECU 6 stores the vehicle ID code VID-A and the vehicle encryption key VK-A but does not store the key ID code KID and the electronic key encryption key K. The initial electronic key 2a stores the key ID code KID-1 and the electronic key encryption key K-1 but does not store the vehicle ID code VID. In this manner, the electronic key 2 and the immobilizer ECU 6 are not paired together and do not have to be shipped out together from a factory. The immobilizer ECU 6 stores the key ID code KID-1 in the initial registration step. In the initial registration step, the key ID code KID-1 is stored in the immobilizer ECU 6. The immobilizer ECU 6 obtains the SEED code SC-if from the initial electronic key 2a, generates the electronic key encryption key K-1 with the SEED code SC-if and the key generation logic f, and stores the electronic key encryption key K-1 in the immobilizer ECU 6. Thus, the electronic key 2 corresponds to only the immobilizer ECU 6 to which the key ID code KID-1 and the electronic key encryption key K-1 are registered, and does not correspond to the immobilizer ECU of another vehicle. Further, the data center 10 stores information related to the electronic key encryption key registered to the immobilizer ECU 6 subsequent to the initial registration. Thus, when manufacturing a replacement immobilizer ECU, information related to the electronic key encryption key K is obtained from the data center 10, and the electronic key encryption key K-1 is stored in the replacement immobilizer ECU. This allows for the electronic key encryption key K-1 to be easily registered to the replacement ECU. In this manner, registration of the initial electronic key 2a to the immobilizer ECU of another vehicle is prevented, a certain security level is maintained, the electronic key 2 and the immobilizer ECU 6 do not have to be paired together when shipped out of a factory, and registration is facilitated.

(3) The SEED code SC-1f of the initial electronic key 2a is deleted in the initial registration step. Thus, when someone attempts to register the initial electronic key 2a to the immobilizer ECU 6 of another vehicle, the electronic key encryption key K-1 cannot be generated. This stops the registration of an initially registered electronic key 2 to the immobilizer ECU 6 of another vehicle.

(4) In online registration, the data center 10 generates the SEED code SC-A2 from the electronic key encryption key K-2, the immobilizer ECU 6 obtains the SEED code SC-A2 from the data center 10, the immobilizer ECU 6 generates the SEED code SC-A2 from the electronic key encryption key K-2, and the immobilizer ECU 6 stores the electronic key encryption key K-2. In offline registration, the immobilizer ECU 6 cannot communicate with the data center 10. Thus, the immobilizer ECU 6 stores the key ID code KID-3, which is stored in the offline additional electronic key 2c, and the electronic key encryption key K-3, which is generated from the SEED code SC-A3 obtained from the offline additional electronic key 2c. In this manner, the electronic key registration system 7 allows for registration of the electronic key 2 to the immobilizer ECU 6.

An electronic key registration system according to a second embodiment of the present invention will now be described focusing on the differences from the first embodiment.

The electronic key registration system of the second embodiment differs from the first embodiment in that the SEED code SC is not obtained from the electronic key 2 in the initial registration step but obtained from the data center 10.

The initial registration of the electronic key 2 will now be described with reference to FIGS. 17 to 19B.

Figure 17:
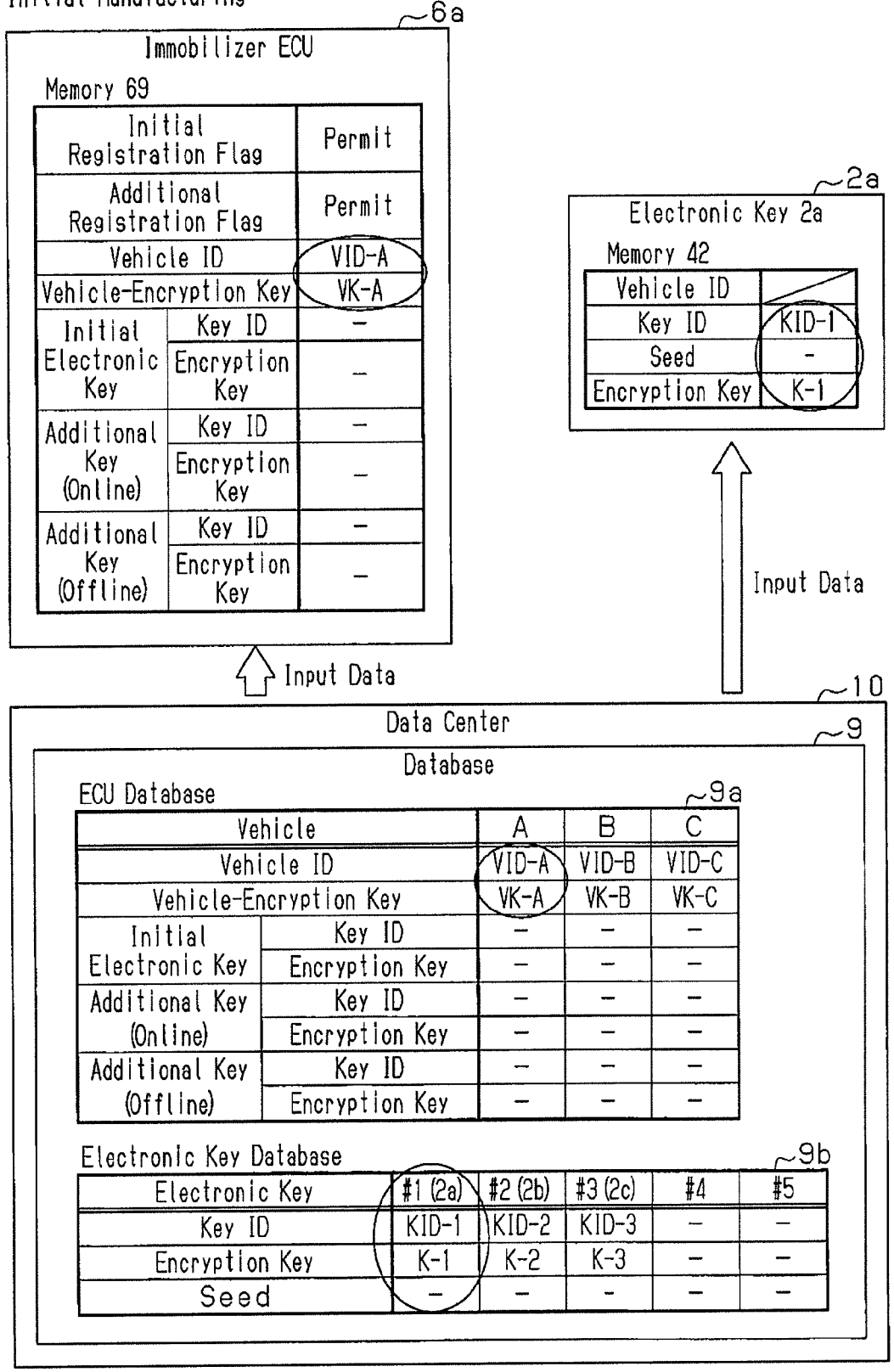
FIG. 17 is a schematic diagram illustrating manufacturing steps of an initial electronic key.

Referring to FIG. 17, an initial manufacturing step is first performed in a key manufacturing step. In the initial manufacturing step, the memory 69 of the initially manufactured immobilizer ECU 6 stores the vehicle ID code VID-A and the vehicle encryption key VK-A. The memory 42 of the initially manufactured electronic key 2 stores the key ID code KID-1 and the electronic key encryption key K-1.

In the initial manufacturing step, the ECU database 9a of the data center 10 stores the vehicle ID code VID-A, which is stored in the initially manufactured immobilizer ECU 6, and the vehicle encryption key VK-A. The electronic key database 9b of the data center 10 stores the key ID code KID-1, which is stored in the initially manufactured electronic key 2, and the electronic key encryption key K-1.

The registration of the electronic key 2 in a factory will now be described with reference to FIGS. 18A to 19B. In the initial registration step, the registration tool 8 is connected to the vehicle 1, and a registration operation is performed on the registration tool 8. The immobilizer ECU 6, which is manufactured as described above, is installed in the vehicle 1, and the electronic key 2 is registered to the immobilizer ECU 6 that is installed in the vehicle 1.

Figure 18A:
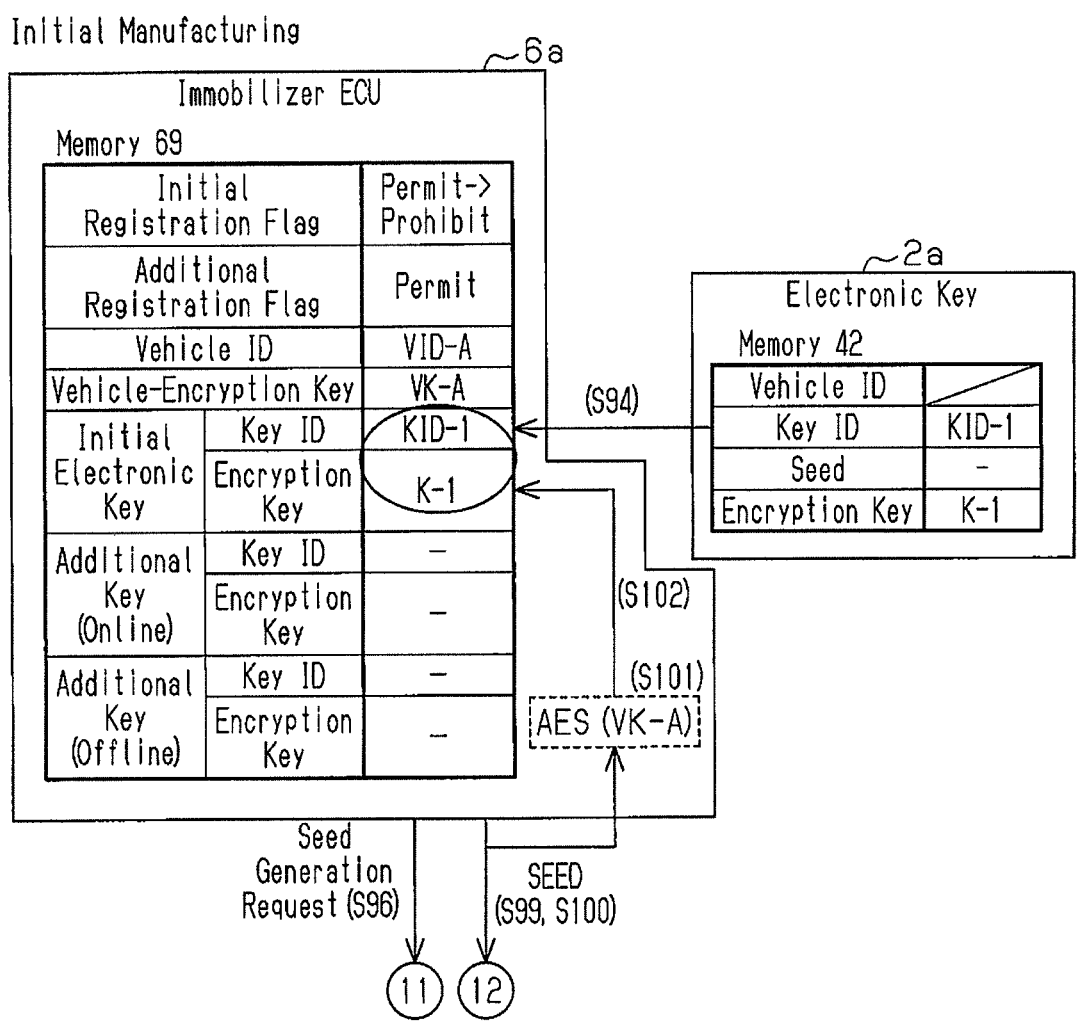
FIGS. 18A and 18B illustrate a schematic diagram illustrating initial registration steps.
Figure 18B:
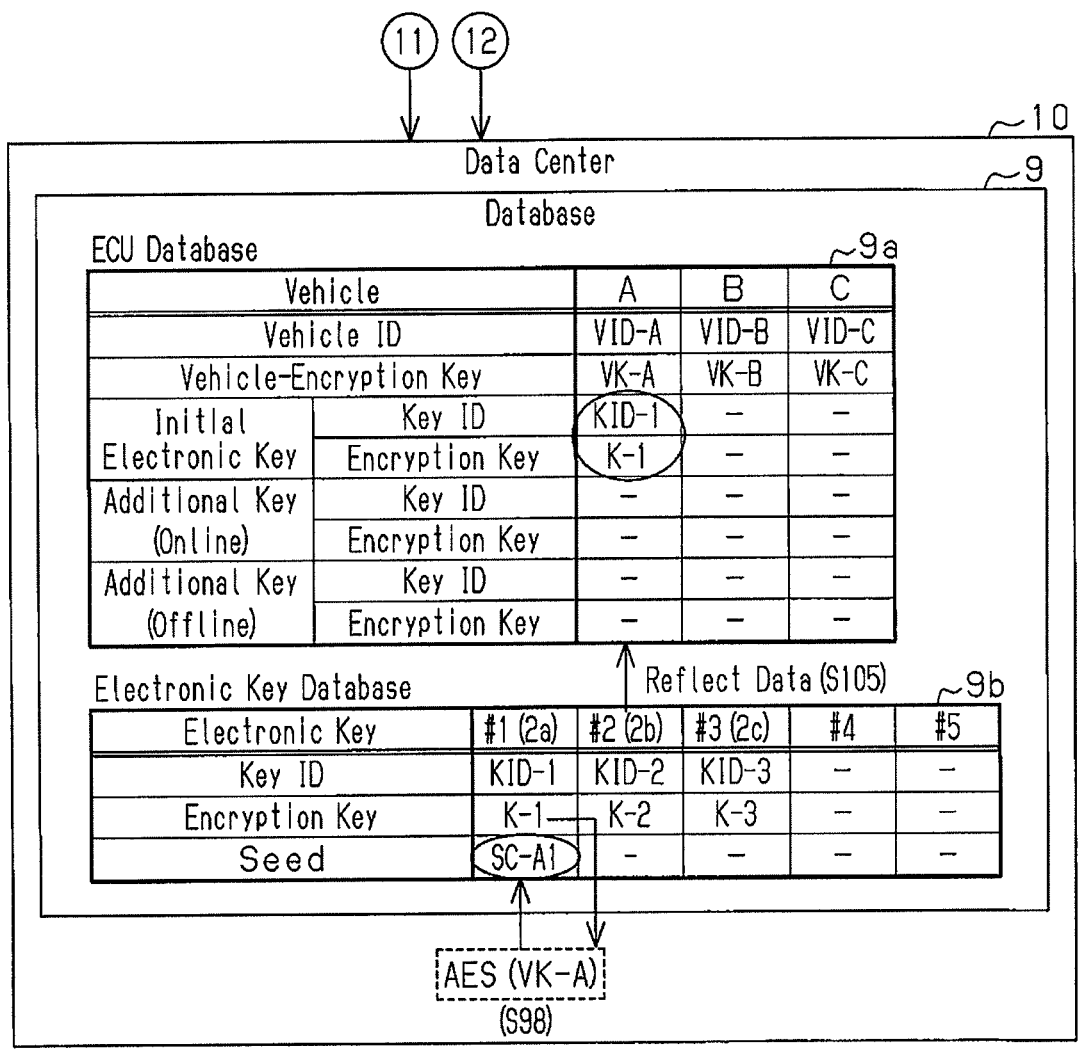

Referring to FIGS. 18A and 18B, in the initial registration step, the immobilizer ECU 6 reads the key ID code KID-1 from the initial electronic key 2a. The immobilizer ECU 6 instructs the data center 10 to generate the SEED code SC-A1, read the generated SEED code SC-A1, generate the electronic key encryption key K-1 from the obtained SEED code SC-A1, and store the electronic key encryption key K-1 in the memory 69. The ECU database 9a of the data center 10 stores the key ID code KID-1 of the registered electronic key 2 when generating the SEED code SC-A1, and stores the electronic key encryption key K-1 of the additional electronic key 2b from the electronic key database 9b.

Figure 19A:
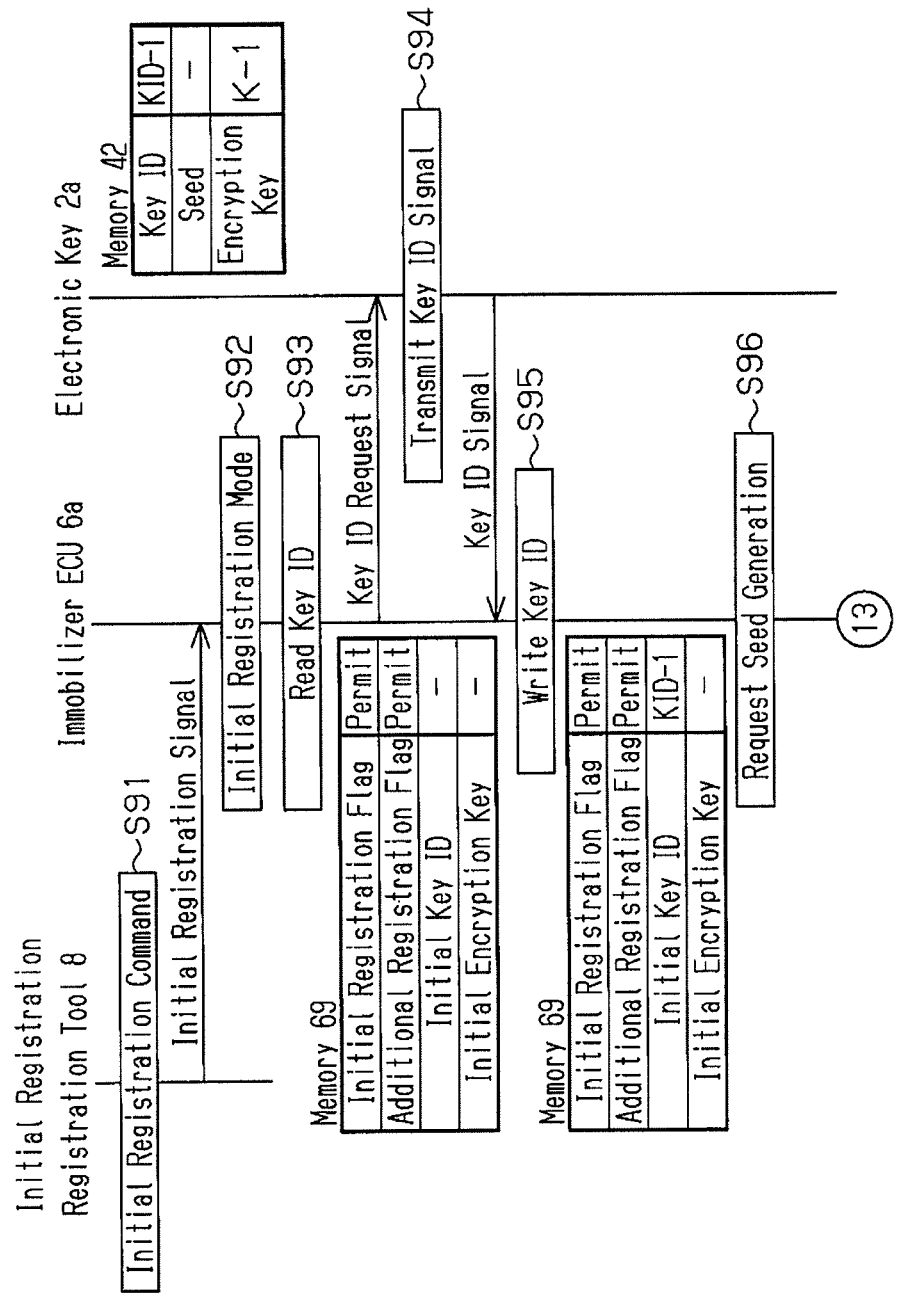
FIGS. 19A and 19B illustrate a sequence chart of the initial registration steps.
Figure 19B:
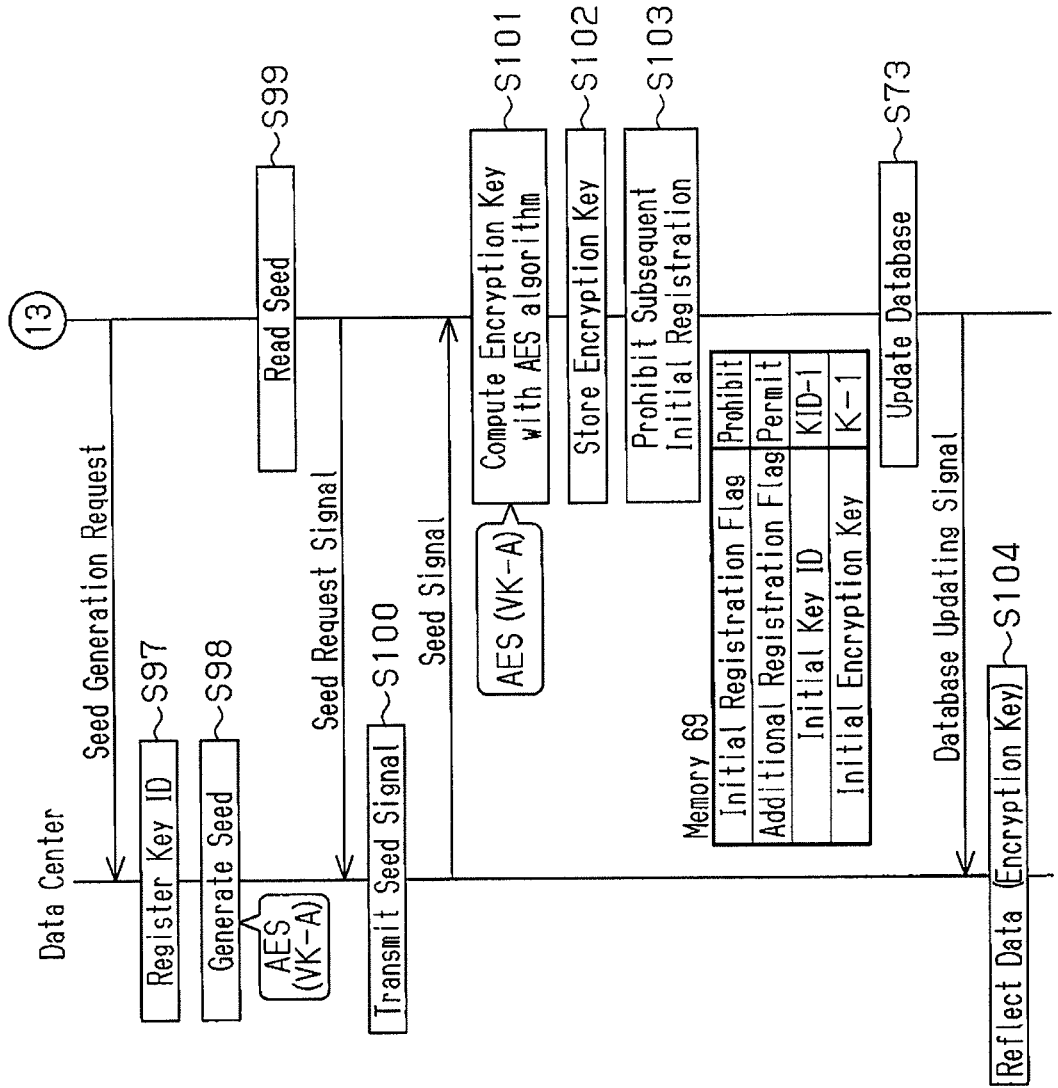

In detail, referring to FIGS. 19A and 19B, when a person performing registration operates the operation unit 82 and sets initial registration, the registration tool 8 provides the immobilizer ECU 6 with an initial registration signal as an initial registration instruction (step S91). When receiving the initial registration signal, the immobilizer ECU 6 switches the operation mode to the initial registration mode (step S92). That is, the mode switching unit 61 switches to the initial registration mode that initially registers the electronic key 2 to the immobilizer ECU.

The immobilizer ECU 6 reads the key ID code KID (step S93). That is, the key ID writing unit 62 transmits a key ID request signal from the coil antenna 5 to request for the key ID code KID.

When receiving the key ID request signal, the electronic key 2 transmits a key ID signal including the key ID code KID (step S94). That is, the transponder 4 transmits a key ID signal including the key ID code KID-1 stored in the memory 42 to the immobilizer ECU 6 from the transmission-reception antenna 21.

When receiving the key ID signal, the immobilizer ECU 6 writes the key ID code KID, which is included in the key ID signal (step S95). That is, the key ID writing unit 62 writes the key ID code KID-1, included in the key ID signal, to the memory 69.

When writing the key ID code KID, the immobilizer ECU 6 requests the data center 10 to generate the SEED code SC (step S96). More specifically, since the SEED code SC is not stored in the data center 10, the SEED generation request unit 65 transmits a SEED generation request signal to instruct the data center 10 to generate a SEED code SC. The SEED generation request signal includes the vehicle ID code VID-A, which is used to specify the vehicle, and the key ID code KID-1 of the initial electronic key 2a.

When receiving the SEED generation request signal, the data center 10 registers the key ID code KID (step S97). That is, the data center 10 stores the key ID code KID-1, which is included in the SEED generation request signal, in the ECU database 9a. The data center 10 generates the SEED code SC corresponding to the additional electronic key 2b (step S98). That is, the data center 10 generates the SEED code SC-A1 from the stored electronic key encryption key K-1 with the vehicle encryption key VK-A in compliance with the encryption standard AES.

The immobilizer ECU 6 reads the SEED code SC (step S99). That is, the SEED reading unit 64 transmits a SEED request signal that requests for the SEED code SC to the data center 10.

When receiving the SEED request signal, the data center 10 transmits the SEED signal (step S100). The data center 10 transmits a SEED signal including the generated SEED code SC-A1 to the immobilizer ECU 6.

The immobilizer ECU 6 calculates the electronic key encryption key K in compliance with the encryption standard AES (step S101). That is, the SEED reading unit 64 obtains the SEED code SC-A1 by receiving the SEED signal. The encryption key generation unit 66 generates the electronic key encryption key K-1 with the vehicle encryption key VK-A from the SEED code SC-A1 obtained from the SEED reading unit 64 in compliance with the encryption standard AES. Thus, the immobilizer ECU 6 does not directly obtain the electronic key encryption key K-1 from the data center 10. Rather, the immobilizer ECU 6 obtains the SEED code SC-A1 to generate the electronic key encryption key K-1.

Then, the immobilizer ECU 6 stores the generated electronic key encryption key K in the memory 69 (step S102). That is, the encryption key registration unit 67 stores the electronic key encryption key K-1, which is generated by the encryption key generation unit 66, in the memory 69 to register the electronic key encryption key K-1 to the immobilizer ECU 6. The immobilizer ECU 6 may perform immobilizer verification by using the registered electronic key encryption key K-1.

When an initial registration prohibition operation is performed, the immobilizer ECU 6 prohibits initial registration (step S103). The encryption key registration unit 67 prohibits initial registration when on/off operations of the ignition switch 14 is repeated for twenty times. As a result, the immobilizer ECU 6 cannot initially register the electronic key 2.

The immobilizer ECU 6 then stores the electronic key encryption key K-1 of the initial electronic key 2a and updates the information of the data center 10 (step S104). That is, the database updating unit 68 provides the data center 10 with a database update signal to update the information of the data center 10. The data center 10 stores the electronic key encryption key K-1 of the electronic key database 9b to the ECU database 9a to reflect the data of the electronic key database 9b to the ECU database 9a (step S105).

Additional registration of an electronic key 2 and registration of a replaced immobilizer ECU 6 to the electronic key 2 are performed in the same manner as the first embodiment.

In the second embodiment, the SEED code SC is not registered when the electronic key 2 is initially registered, and the SEED code (SC-A1) is obtained from the data center in the initial registration step to store the electronic key encryption key K-1 in the immobilizer ECU 6. Thus, there is no need to store the SEED code SC in the electronic key 2, and the SEED code SC is not obtained from the electronic key 2. This increases the security level.

In addition to advantages (1) to (4) of the first embodiment, the second embodiment has the advantages described below.

(5) In the initial manufacturing step, the immobilizer ECU 6 stores the vehicle ID code VID-A and the vehicle encryption key VK-A but not the key ID code KID and the electronic key encryption key K. The initial electronic key 2a stores the key ID code KID-1 and the encryption key encryption key K-1 but not the vehicle ID code VID. In this manner, the electronic key 2 and the immobilizer ECU 6 are not paired and thus do not have to be shipped out of a factory together. The SEED code SC-A1 is obtained from the electronic key encryption key K-1 stored in the data center 10, and the electronic key encryption key K-1 is generated from the SEED code SC-A1 and stored in the immobilizer ECU 6. Thus, when registering the electronic key encryption key K-1 to the immobilizer ECU 6, the electronic key encryption key K is not transmitted and received between the immobilizer ECU 6 and the electronic key 2. This stops the registration of the initial electronic key 2a to the immobilizer ECU 6 of another vehicle, maintains a certain security level, eliminates the need to ship the paired electronic key 2 and the immobilizer ECU 6 together out of a factory, and facilitates registration.

It should be apparent to those skilled in the art that the present invention may be embodied in many other specific forms without departing from the spirit or scope of the invention. Particularly, it should be understood that the present invention may be embodied in the following forms.

In each of the above embodiments, an immobilizer ECU 6 that registers an electronic key 2 under an offline environment is replaced by a new immobilizer ECU 6 under an offline environment. Instead, an immobilizer ECU 6 that registers an electronic key 2 under an online environment may be replaced by a new immobilizer ECU 6 under an offline environment.

In each of the above embodiments, in the replacement ECU manufacturing step performed under an offline environment, the immobilizer ECU 6 stores the vehicle ID code VID-A of the initially manufactured immobilizer ECU 6 prior to replacement, the vehicle encryption key VK-A, the key ID code KID-1 of the initial electronic key 2a, the electronic key encryption key K-1, the key ID code KID-3 of the additional electronic key 2b, and the electronic key encryption key K-3. However, as long as the key ID code KID and the electronic key encryption key K of the initial electronic key 2a and the additional electronic key 2b are stored in the immobilizer ECU 6, the immobilizer ECU 6 do not have to store the vehicle ID code VID-A and the vehicle encryption key VK-A.

In each of the above embodiments, the encryption standard AES is used when generating the SEED code SC and the electronic key encryption key K in the additional registration step and the replacement immobilizer ECU registration step. However, other encryption standards and encryption protocols may be used.

In each of the above embodiments, the use of the key generation logic f is prohibited subsequent to initial registration. Instead, the key generation logic f may be deleted.

In each of the above embodiments, the use of the key generation logic f is prohibited subsequent to initial registration. However, the use of the key generation logic f may be allowed subsequent to initial registration.

In each of the above embodiments, before executing the additional registration instruction in the additional registration step performed under an online environment, the data center 10 may verify the person performing the registration. For example the person performing the registration may have an ID code and a password used for verification by the data center 10.

In each of the above embodiments, the user differs from the person performing registration. However, the user may be the person performing registration.

The registration tool may be a dedicated registration tool or a device formed by a versatile computer such as a personal computer or smartphone incorporating software used for registration.

In the initial registration step of each of the above embodiments, the SEED code is deleted from the memory 42 of the electronic key 2 after initial registration. However, the SEED code does not have to be deleted if there is no possibility of an encryption key being generated from the SEED code.

In each of the above embodiments, the encryption key may be registered after challenge-response verification is performed in the initial registration step and the additional registration step.

In each of the above embodiments, the vehicle ID code VID is shown on the display 15 of the vehicle 1 when obtained so that the vehicle ID code VID may be checked. However, when a certain operation requesting for the vehicle ID code VID is performed on the vehicle 1, a mail be set to a mail address designated by the user. This allows for only the user who receives the mail to check the vehicle ID code VID and thereby obtains superior confidentiality.

The initial registration prohibition operation may be an operation other that performed with the ignition switch 14.

In each of the above embodiments, the present invention is applied to the immobilizer system 3 of a type that inserts the electronic key 2 into the key cylinder. However, the present invention may be applied to an electronic key system of a type that becomes communicable when the electronic key 2 enters a communication area formed by the vehicle.

In each of the above embodiments, the present invention is applied to an electronic key system of the vehicle 1. Instead, the present invention may be applied to an electronic key system for a building such as a house.

The present examples and embodiments are to be considered as illustrative and not restrictive, and the invention is not to be limited to the details given herein, but may be modified within the scope and equivalence of the appended claims.

The invention claimed is:

1. An electronic key registration system that registers an electronic key device to a vehicle, the electronic key registration system comprising:
   a controller arranged in the vehicle and capable of accessing a data center through at least a network;
   an initial electronic key device, an online additional electronic key device, and an offline additional electronic key device, each storing a unique key ID code and a unique encryption key, wherein each of the electronic key devices is configured to use the corresponding electronic key device encryption key when performing a wireless verification communication with the controller of the vehicle; and
   a computer-readable medium having instructions stored thereon that include:
      a first set of instructions configured to store, in the controller, a unique vehicle ID code and a vehicle encryption key that is used for the registration, and store, in the data center, the vehicle ID code and the vehicle encryption key that are stored in the controller;
      a second set of instructions configured to store, in the online additional electronic key device, the key ID code and the electronic key device encryption key corresponding to the online additional electronic key device;
      a third set of instructions configured to store, in the data center, the key ID code and the electronic key device encryption key that are stored in the online additional electronic key device;
      a fourth set of instructions configured to transmit, from the controller online to the data center, the vehicle ID code and the key ID code of the online additional electronic key device;
      a fifth set of instructions configured to generate, with the data center, an encryption key generation code using the vehicle encryption key corresponding to the vehicle ID code and the electronic key device encryption key corresponding to the key ID code of the online additional electronic key device that are stored in the data center;
      a sixth set of instructions configured to obtain the encryption key generation code from the data center with the controller online, generate the electronic key device encryption key of the online additional electronic key device from the obtained encryption key generation code with the controller online, and store the electronic key device encryption key of the online additional electronic key device in the controller;
      a seventh set of instructions configured to store, in the offline additional electronic key device, the electronic key device encryption key corresponding to the key ID code of the offline additional electronic key device, and store, in the offline additional electronic key device, an encryption key generation code generated using the vehicle encryption key corresponding to the vehicle ID code that is in correspondence with information indicated on an order sheet and the stored electronic key device encryption key;
      an eighth set of instructions configured to obtain, with the data center, the electronic key device encryption key and the key ID code that are stored in the offline additional electronic key device, and store, in the data center, the electronic key device encryption key and the key ID code in association with the vehicle ID code; and
      a ninth set of instructions configured to read, when the controller is not able to communicate with the data center through at least the network, the encryption key generation code from the offline additional electronic key device, generate an electronic key device encryption key for the offline additional electronic key device using the vehicle key encryption key stored in the controller, and store, in the controller, the generated electronic key device encryption key and the key ID code read from the offline additional electronic key device.

2. The electronic key registration system according to claim 1, the instructions of the computer-readable medium further includes:
an initial electronic key device manufacturing instruction configured to
store, in the initial electronic key device, the key ID code and the electronic key device encryption key of the initial electronic key device,
store, in the initial electronic key device, the encryption key generation code generated with the electronic key device encryption key that is stored in the initial electronic key device and a key generation logic, and
store, in the data center, the key ID code and the electronic key device encryption key that are stored in the initial electronic key device; and
an initial registration instruction configured to
generate, with the controller, the electronic key device encryption key for the initial electronic key device using the encryption key generation code that is obtained from the initial electronic key device and a key generation logic,
store, in the controller, the generated electronic key device encryption key, and
store, in the data center, the key ID code of the initial electronic key device stored in the controller and the vehicle ID code in association with each other.

3. The electronic key registration system according to claim 2, wherein the initial registration instruction includes an instruction for deleting the encryption key generation code from the initial electronic key device when the electronic key device encryption key of the initial electronic key device is stored in the controller.

4. The electronic key registration system according to claim 2, wherein the initial registration instruction includes an instruction for writing the electronic key device ID code read by the controller from the initial electronic key device to the controller.

5. The electronic key registration system according to claim 1, the instructions of the computer-readable medium further includes:
an initial electronic key device manufacturing instruction configured to
store, in the initial electronic key device, the key ID code and the electronic key device encryption key of the initial electronic key device, and
store, in the data center, the electronic key device ID code and the electronic key device encryption key that are stored in the initial electronic key device; and
an initial registration instruction configured to
transmit, from the controller to the data center, the vehicle ID code and the electronic key device ID code that is read from the initial electronic key device,
generate, with the data center, an encryption key generation code generated from the electronic key device encryption key associated with the electronic key device ID code of the initial electronic key device using the vehicle encryption key associated with the vehicle ID code stored in the data center,
obtain, with the controller, the generated encryption key generation code from the data center,
generate, with the controller, the electronic key device encryption key for the initial electronic key device from the obtained encryption key generation code, and
store, in the controller, the generated electronic key device encryption key.

6. The electronic key registration system according to claim 1, further comprising an online replacement controller and an offline replacement controller that replace the controller, wherein the instructions of the computer-readable medium further includes:
an online replacement controller manufacturing instruction configured to
store, in the online replacement controller, a unique vehicle ID code and a vehicle encryption key, and
then store, in the data center with the online replacement controller, the vehicle ID code and the vehicle encryption key that are stored in the online replacement controller,
an online replacement controller registration instruction configured to
obtain, with the data center, the electronic key device ID code of at least one of the electronic key devices,
generate, with the data center, an encryption key generation code for the at least one of the electronic key devices using the electronic key device encryption key that corresponds to the obtained electronic key device ID code and is stored in the data center and the vehicle encryption key of the online replacement controller that is stored in the data center,
obtain, with the online replacement controller, the generated encryption key generation code from the data center,
generate, with the online replacement controller, an electronic key device encryption key for the at least one of the electronic key devices from the obtained encryption key generation code, and
store, in the online replacement controller, the generated electronic key device encryption key;
an offline replacement controller manufacturing instruction configured to
obtain, with the offline replacement controller from the data center, the vehicle ID code that is stored in the data center in association the vehicle indicated on an order sheet and an electronic key device ID code and an electronic key device encryption key of every one of the electronic key devices stored in the data center in association with the vehicle ID code, and
store, in the offline replacement controller, the vehicle ID code and the electronic key device ID code and the electronic key device encryption of every one of the electronic key devices; and
an offline replacement controller registration instruction configured to
obtain, with the offline replacement controller, the electronic key device ID code of at least one of the electronic key devices, and
register, with the offline replacement controller, the at least one of the electronic key devices when the obtained key ID code is the same as at least one of the key ID codes stored in the offline replacement controller.

7. An electronic key registration system, comprising:
a registration tool that outputs a registration signal for requesting for registering an electronic key device to a vehicle;
a controller arranged in the vehicle and capable of accessing a data center through at least a network; and
an electronic key device, storing a unique key ID code and a unique encryption key, wherein the electronic key device is configured to use the electronic key device encryption key when performing a wireless verification communication with the controller of the vehicle, wherein the registration tool, the controller, the electronic key device, and the data center include one or more computer-readable media having instructions stored thereon, wherein the controller is configured to receive the registration signal from the registration tool and to determine whether the received registration signal is an initial registration signal or an additional registration signal, wherein when the registration signal is an initial registration signal, the controller, the electronic key device and the data center are programmed to store, in the controller, a unique vehicle ID code and a vehicle encryption key that is used for the registration, and store, in the data center, the vehicle ID code and the vehicle encryption key that are stored in the controller, and wherein when the controller is able to communicate with the data center through at least the network and the registration signal is an additional registration signal, the controller, the electronic key device and the data center are programmed to:
- store, in the electronic key device, the key ID code and the electronic key device encryption key corresponding to the electronic key device;
- store, in the data center, the key ID code and the electronic key device encryption key that are stored in the electronic key device;
- transmit, from the controller online to the data center, the vehicle ID code and the key ID code of the electronic key device;
- generate, with the data center, an encryption key generation code using the vehicle encryption key corresponding to the vehicle ID code and the electronic key device encryption key corresponding to the key ID code of the electronic key device that are stored in the data center; and
- obtain the encryption key generation code from the data center with the controller online, generate the electronic key device encryption key of the electronic key device from the obtained encryption key generation code with the controller online, and store the electronic key device encryption key of the electronic key device in the controller;

wherein when the controller is not able to communicate with the data center through at least the network and the registration signal is an additional registration signal, the controller, the electronic key device and the data center are programmed to:
- store, in the electronic key device, the electronic key device encryption key corresponding to the key ID code of the electronic key device, and store, in the electronic key device, an encryption key generation code generated using the vehicle encryption key corresponding to the vehicle ID code that is in correspondence with information indicated on an order sheet and the stored electronic key device encryption key;
- obtain, with the data center, the electronic key device encryption key and the key ID code that are stored in the electronic key device, and store, in the data center, the electronic key device encryption key and the key ID code in association with the vehicle ID code; and
- read, when the controller is not able to communicate with the data center through at least the network, the encryption key generation code from the electronic key device, generate an electronic key device encryption key for the electronic key device using the vehicle key encryption key stored in the controller, and store, in the controller, the generated electronic key device encryption key and the key ID code read from the electronic key device.

* * * * *

UNITED STATES PATENT AND TRADEMARK OFFICE
CERTIFICATE OF CORRECTION

| | | |
|---|---|---|
| PATENT NO. | : 9,137,658 B2 | Page 1 of 1 |
| APPLICATION NO. | : 13/903342 | |
| DATED | : September 15, 2015 | |
| INVENTOR(S) | : D. Kawamura et al. | |

It is certified that error appears in the above-identified patent and that said Letters Patent is hereby corrected as shown below:

Claims

Column 24, line 38 (claim 6, line 38) please change "association the" to -- association with the --.

Signed and Sealed this
Eighth Day of March, 2016

Michelle K. Lee
*Director of the United States Patent and Trademark Office*